(12) United States Patent
Talbot et al.

(10) Patent No.: US 8,558,736 B2
(45) Date of Patent: Oct. 15, 2013

(54) GNSS SIGNAL PROCESSING METHODS AND APPARATUS WITH IONOSPHERIC FILTERS

(75) Inventors: Nicholas Charles Talbot, Ashburton (AU); Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 261 days.

(21) Appl. No.: 13/143,192

(22) PCT Filed: Feb. 16, 2010

(86) PCT No.: PCT/US2010/000439
§ 371 (c)(1),
(2), (4) Date: Jul. 3, 2011

(87) PCT Pub. No.: WO2010/096158
PCT Pub. Date: Aug. 26, 2010

(65) Prior Publication Data
US 2011/0279314 A1    Nov. 17, 2011

Related U.S. Application Data

(60) Provisional application No. 61/208,333, filed on Feb. 22, 2009.

(51) Int. Cl.
*G01S 19/44* (2010.01)

(52) U.S. Cl.
USPC .................................................. 342/357.27

(58) Field of Classification Search
USPC .................................................. 342/357.27
See application file for complete search history.

(56) References Cited

U.S. PATENT DOCUMENTS

| | | |
|---|---|---|
| 7,312,747 B2 | 12/2007 | Vollath et al. |
| 7,432,853 B2 | 10/2008 | Vollath |
| 7,498,979 B2 | 3/2009 | Liu et al. |
| 7,538,721 B2 | 5/2009 | Vollath et al. |
| 7,541,975 B2 | 6/2009 | Sever et al. |
| 7,589,668 B2 | 9/2009 | Vollath et al. |
| 7,692,578 B2 | 4/2010 | Vollath et al. |
| 7,746,272 B2 | 6/2010 | Vollath |
| 7,755,542 B2 | 7/2010 | Chen et al. |
| 7,868,820 B2 | 1/2011 | Kolb |
| 7,982,667 B2 | 7/2011 | Vollath et al. |
| 8,018,377 B2 | 9/2011 | Collins |
| 8,130,143 B2 | 3/2012 | Liu et al. |
| 8,237,609 B2 | 8/2012 | Talbot et al. |
| 8,368,590 B2 | 2/2013 | Vollath et al. |
| 8,368,591 B2 | 2/2013 | Talbot et al. |
| 8,400,351 B2 | 3/2013 | Talbot et al. |
| 2005/0101248 A1 | 5/2005 | Vollath |
| 2008/0165053 A1 | 7/2008 | Liu et al. |
| 2009/0027264 A1 | 1/2009 | Chen et al. |
| 2009/0184869 A1 | 7/2009 | Talbot et al. |
| 2009/0224969 A1* | 9/2009 | Kolb ................. 342/357.04 |
| 2010/0141515 A1 | 6/2010 | Doucet et al. |
| 2010/0188285 A1* | 7/2010 | Collins ............... 342/357.04 |
| 2010/0253575 A1 | 10/2010 | Vollath |
| 2011/0140959 A1 | 6/2011 | Vollath |
| 2011/0148698 A1 | 6/2011 | Vollath |
| 2011/0156949 A1 | 6/2011 | Vollath et al. |
| 2011/0187590 A1 | 8/2011 | Leandro |
| 2011/0267228 A1 | 11/2011 | Talbot et al. |
| 2011/0279314 A1 | 11/2011 | Talbot et al. |
| 2011/0285587 A1 | 11/2011 | Vollath et al. |
| 2012/0026038 A1 | 2/2012 | Vollath |
| 2012/0092213 A1 | 4/2012 | Chen |
| 2012/0119944 A1 | 5/2012 | Chen |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0162007 A1 | 6/2012 | Leandro et al. |
| 2012/0163419 A1 | 6/2012 | Seeger |
| 2012/0229332 A1 | 9/2012 | Vollath et al. |
| 2012/0286991 A1 | 11/2012 | Chen et al. |
| 2012/0293367 A1 | 11/2012 | Chen et al. |
| 2012/0306694 A1 | 12/2012 | Chen et al. |
| 2013/0044026 A1 | 2/2013 | Chen et al. |

FOREIGN PATENT DOCUMENTS

| | | |
|---|---|---|
| EP | 1 862 809 A1 | 5/2007 |
| WO | 2010/096158 A2 | 8/2010 |
| WO | 2010/096159 A9 | 8/2010 |
| WO | 2010/096158 A3 | 11/2010 |
| WO | 2010/096159 A3 | 11/2010 |
| WO | 2012/1128979 A2 | 9/2012 |
| WO | 2012/1128980 A1 | 9/2012 |
| WO | 2012/1151006 A1 | 11/2012 |

OTHER PUBLICATIONS

J.-P. Berthias et al., "Lessons Learned from the Use of a GPS Receiver in Less than Optimal Conditions," Paper Presented at the 16th International Symposium on SpaceFlight Dynamics held in Pasadena, USA, on Dec. 3-6, 2006, 11 pp.

D. Goldstein et al., "Real-Time, Autonomous, Precise Orbit Determination Using GPS," Navigation: Journal of the Institute of Navigation, vol. 48, No. 3, Fall 2001, pp. 155-168.

S. Lo et al., "GNSS Album: Images and Spectral Signatures of the New GNSS Signals," InsideGNSS, May/Jun. 2006, pp. 46-56.

O. Montenbruck et al., "Phoenix-XNS—A Minature Real-Time Navigation System for LEO Satellites," NAVITEC'2006, Dec. 11-13, 2006, 8 pp.

B. Remondi, Final Report: Investigation of Global Positioning System Single Frequency Hardware for the U.S. Environmental Protection Agency, EPA Reference DW13936132-01-0, Apr. 1994, 10 pp.

A. Simsky, "Standalone real-time navigation algorithm for single-frequency ionosphere-free positioning based on dynamic ambiguities (DARTS-SF)", ION GNSS 2006, Fort Worth, USA, Sep. 26-29, 2006, Session D1, 10 pp.

S. Verhagen, The GNSS integer ambiguities: estimation and validation, Delft Institute of Earth Observation and Space Systems, Delft University of Technology, 2004, ISBN 90-804147-4-3, 196 pp.

T. Yunck, "Orbit Determination," Chapter 21 of Global Positioning System: Theory and Applications vol. II, vol. 164 in Progress in Astronautics and Aeronautics, 1994, pp. 559-592.

International Search Report and Written Opinion of the International Searching Authority dated Sep. 30, 2010 in International Application No. PCT/US2010/000439, 10 pp.

International Search Report and Written Opinion of the International Searching Authority dated Sep. 30, 2010 in International Application No. PCT/US2010/000440, 10 pp.

Office Action dated Nov. 7, 2012 in Chinese Patent Application No. 201080008532.X, 6 pp. (with English-language translation, 4 pp).

Office Action dated Oct. 30, 2012 in Chinese Patent Application No. 201080008547.6, 8 pp. (with English-language translation, 5 pp.).

\* cited by examiner

*Primary Examiner* — Harry Liu

(74) *Attorney, Agent, or Firm* — Bruce D Riter

(57) ABSTRACT

Methods and apparatus are provided for processing a set of GNSS signal data derived from signals of a first set of satellites having at least three carriers and signals of a second set of satellites having two carriers. A geometry filter uses a geometry filter combination to obtain an array of geometry-filter ambiguity estimates for the geometry filter combination and associated statistical information. Ionosphere filters use a two-frequency ionospheric combination to obtain an array of ionosphere-filter ambiguity estimates for the two-frequency ionospheric combinations and associated statistical information. Each two-frequency ionospheric combination comprises a geometry-free two-frequency ionospheric residual carrier-phase combination of observations of a first frequency and observations of a second frequency. Auxiliary ionosphere filters use an auxiliary ionospheric combination to obtain an array of auxiliary-ionosphere-filter ambiguity estimates for the auxiliary ionospheric combinations and associated statistical information. Each auxiliary ionospheric combination uses carrier-phase observations of a third frequency and carrier-phase observations of at least one of the first frequency and the second frequency. A combined array of ambiguity estimates is prepared for all carrier phase observations and associated statistical information by combining the arrays of the geometry filter and the ionosphere filters and the auxiliary ionosphere filters.

41 Claims, 17 Drawing Sheets

GNSS SIGNAL PROCESSING METHODS AND APPARATUS WITH IONOSPHERIC FILTERS

CROSS REFERENCE TO RELATED APPLICATIONS

The content of U.S. Pat. No. 7,432,853, VOLLATH U., "Ambiguity Estimation of GNSS Signals for Three or more Carriers," is incorporated herein by this reference.

The content of U.S. patent application Ser. No. 12/286,672, VOLLATH U., "Ambiguity Estimation of GNSS Signals for Three or more Carriers," filed Sep. 30, 2008, is incorporated herein by this reference.

The content of U.S. Pat. No. 7,312,747, VOLLATH U. and DOUCET K., "Multiple-GNSS and FDMA High-Precision Carrier-Phase Based Positioning," dated Dec. 25, 2007 is incorporated herein by this reference.

The content of Patent Application Publication US 2008/0165055, VOLLATH U. and DOUCET K., "GNSS Signal Processing with Frequency-Dependent Bias Modeling," dated Jul. 10, 2008 is incorporated herein by this reference.

The content of Patent Application Publication US 2008/0165054, VOLLATH U. and DOUCET K., "GNSS Signal Processing with Partial Fixing of Algorithms," dated Jul. 10, 2008 is incorporated herein by this reference.

The content of International Patent Publication WO 2007/032947, KOLB, P., "Ionosphere Modeling Apparatus and Methods," dated 22 Mar. 2007 is incorporated herein by this reference.

The content of Patent Application Publication US 2009/0027264, CHEN, X. and VOLLATH U., "GNSS Signal Processing Methods and Apparatus," dated Jan. 29, 2009 is incorporated herein by this reference.

The content of Patent Application Publication US 2008/0165053, LIU, J. and VOLLATH U. and WEST. P. and KLOSE S., "Fast Decimeter-Level GNSS positioning," dated Jul. 10, 2008 is incorporated herein by this reference.

The content of U.S. patent application Ser. No. 12/321,843, LIU, J. and VOLLATH U. and WEST. P. and KLOSE S., "Fast Decimeter-Level GNSS positioning," filed Jan. 26, 2009 is incorporated herein by this reference.

The content of U.S. patent application Ser. No. 12/291,888, VOLLATH U. and KLOSE S., "Real-Time Fast Decimeter-Level GNSS positioning," filed Nov. 14, 2008 is incorporated herein by this reference.

The content of International Patent Publication WO 2009/000314, VOLLATH U. and DOUCET K., "Position Tracking Device and Method," dated 31 Dec. 2008 is incorporated herein by this reference.

The content of U.S. patent application Ser. No. 12/319,623, TALBOT N. and VOLLATH U., "Processing Multi-GNSS Data From Mixed-Type Receivers," filed Jan. 8, 2009 is incorporated herein by this reference.

The content of International Patent Application No. PCT/US2008/012045, VOLLATH U., "Generalized Partial Fixing," with international filing date 23 Oct. 2008 is incorporated herein by this reference.

The content of U.S. Provisional Application for Patent 61/189,382, VOLLATH U. and TALBOT N., "Position Estimation Methods and Apparatus," filed 19 Aug. 2008 is incorporated herein by this reference.

The content of U.S. Provisional Application for Patent 61/208,333, TALBOT N. and VOLLATH U., "GNSS Surveying Methods and Apparatus," filed 22 Feb. 2009 is incorporated herein by this reference, and priority benefit thereof is hereby claimed.

FIELD OF THE INVENTION

The present invention relates to the field of Global Navigation Satellite Systems. More particularly, the present invention relates to methods and apparatus for processing of signals from GNSS satellites having mixed numbers of carrier frequencies.

BACKGROUND OF THE INVENTION

Global Navigation Satellite Systems (GNSS) include the Global Positioning System (GPS), the GLONASS system, the proposed Galileo system, and the proposed Beidou (Compass) system.

The Global Positioning System completed its original design goals when it attained full operational capability in 1995. Technical advances and new demands on the system have since led to a modernization effort. The GPS modernization project involves new ground stations and new satellites, with additional navigation signals and improved accuracy and availability. The first GPS satellite with three-frequency capability including the new L5 frequency, GPS Block IIF-1, is expected to be launched in the summer of 2009. The new civilian-use L5 signal is expected to improve signal structure for enhanced performance, with higher transmission power and wider bandwidth than the L1 and L2C signals to better manage interference than with L2. Launch of additional three-frequency GPS satellites is planned, with a full three-frequency constellation probably available only 5-7 years later.

The European Galileo satellite system will have similar three-frequency capabilities, but may not provide them all free-to-air. To date only two Galileo validation element satellites GIOVE-A and GIOVE-B have been launched. Further, the Galileo launch schedule is lagging behind the original plan. The Chinese Compass system is in the early stages of testing, but may offer three-frequency capabilities when it eventually becomes operational. The Russian GLONASS system is also expected to have three-frequency capabilities at some time in the future.

There will be a transitional period during which a subset of the GNSS satellite constellation will have three-frequency capabilities, while the remainder will continue to broadcast on just two frequencies.

U.S. Pat. No. 7,432,853, VOLLATH U., "Ambiguity Estimation of GNSS Signals for Three or more Carriers" presents a distributed filtering schemes which efficiently deliver ambiguity estimates for two, three or more carrier signals, and addresses to some of the issues raised with mixed constellations of two and three-or-more frequency satellites.

Improved methods and apparatus for processing GNSS signals are desired, particularly to improve ambiguity estimation of GNSS signals from satellites having mixed numbers of carriers.

SUMMARY OF THE INVENTION

Methods and apparatus in accordance with embodiments of the invention provide for improved processing of GNSS signal having mixed numbers of carriers. Some embodiments provide for improved ambiguity estimation of GNSS signals from satellites having a blend of two- and three-or-more signals, some of which may be observed by GNSS receivers as one-frequency signals.

In accordance with some embodiments of the invention, methods and apparatus are provided for processing a set of GNSS signal data derived from signals of a first set of satellites having at least three carriers and signals of a second set of satellites having two carriers, comprising: applying to the set of GNSS signal data a geometry filter using a geometry filter combination to obtain an array of geometry-filter ambiguity estimates for the geometry filter combination and associated statistical information, applying to the set of GNSS signal data a bank of ionosphere filters each using a two-frequency ionospheric combination to obtain an array of ionosphere-filter ambiguity estimates for the two-frequency ionospheric combinations and associated statistical information, wherein each said two-frequency ionospheric combination comprises a geometry-free two-frequency ionospheric residual carrier-phase combination of observations of a first frequency and observations of a second frequency; applying to the set of GNSS signal data a bank of auxiliary ionosphere filters each using an auxiliary ionospheric combination to obtain an array of auxiliary-ionosphere-filter ambiguity estimates for the auxiliary ionospheric combinations and associated statistical information, wherein each said auxiliary ionospheric combination uses carrier-phase observations of a third frequency and carrier-phase observations of at least one of the first frequency and the second frequency, and preparing a combined array of ambiguity estimates for all carrier phase observations and associated statistical information by combining the arrays of the geometry filter and the ionosphere filters and the auxiliary ionosphere filters.

In accordance with some embodiments, the geometry filter combination comprises one of a two-frequency geometry carrier-phase combination, a single-frequency carrier-phase and code combination, and a single-frequency carrier-phase and GRAPHIC combination. In accordance with some embodiments, the two-frequency geometry carrier-phase combination is a minimum-error combination. In accordance with some embodiments, the two-frequency geometry carrier-phase combination is a combination of the GPS L1 carrier frequency and the GPS L2 carrier frequency. In accordance with some embodiments, the single-frequency carrier-phase and code combination is a combination of GPS L1 carrier-phase and GPS L1 code. In accordance with some embodiments, the single-frequency of the single-frequency carrier-phase and GRAPHIC combination is the GPS L1 carrier frequency. In accordance with some embodiments, the bank of ionosphere filters comprises one said ionosphere filter per satellite of the second set of satellites.

In accordance with some embodiments, the auxiliary ionospheric combination comprises one of: a two-frequency geometry-free ionospheric carrier-phase combination of the first frequency and the third frequency, and a three-frequency geometry-free ionospheric carrier-phase combination of the first frequency, the second frequency and the third frequency. In accordance with some embodiments, the auxiliary ionospheric combination is a minimum-error combination. In accordance with some embodiments, the bank of auxiliary ionosphere filters comprises one said auxiliary ionosphere filter per satellite of the first set of satellites. In accordance with some embodiments, at least one code filter is applied to the set of GNSS signal data using a respective geometry-free code-carrier combination to obtain an array of ambiguity estimates for the code-carrier combinations and associated statistical information. In accordance with some embodiments, the combined array is prepared by combining the arrays of at least one code filter with the arrays of the geometry filter and the ionosphere filters and the auxiliary ionosphere filters to obtain the combined array of ambiguity estimates for all carrier phase observations and associated statistical information.

In accordance with some embodiments, each geometry-free code-carrier combination comprises one of: a combination of a first-frequency code observation with a first- and second-frequency carrier phase combination in which ionospheric bias of the first- and second-frequency carrier phase combination is matched to ionospheric bias of the first-frequency code observation; and a two-frequency narrow-lane code combination with a two-frequency wide-lane carrier-phase combination. In accordance with some embodiments, at least one code filter is provided per satellite of the second set of satellites.

In accordance with some embodiments, at least one bank of additional filters is applied to the set of GNSS signal data derived from the first set of satellites, wherein each additional filter uses a geometry-free and ionosphere-free carrier-phase combination of at least three frequencies to obtain an array of ambiguity estimates for the geometry-free and ionosphere-free carrier-phase combination and associated statistical information, and wherein preparing a combined array comprises one of: combining the arrays of additional filters with the arrays of the geometry filter and the ionosphere filters and the auxiliary ionosphere filters to obtain the combined array of ambiguity estimates for all carrier phase observations and associated statistical information; and combining the arrays of additional filters with the arrays of at least one code filter and the geometry filter and the ionosphere filters and the auxiliary ionosphere filters to obtain the combined array of ambiguity estimates for all carrier phase observations and associated statistical information. In accordance with some embodiments, at least one bank of additional filters comprises at least one additional filter per satellite of the first set of satellites.

In accordance with some embodiments, at least one auxiliary code filter is applied to the set of GNSS signal data using a respective geometry-free auxiliary code-carrier combination to obtain an array of ambiguity estimates for the auxiliary code-carrier combination and associated statistical information, and preparing a combined array comprises one of: combining arrays of the additional filters with the arrays of the geometry filter and the ionosphere filters and the auxiliary ionosphere filters to obtain the combined array of ambiguity estimates for all carrier phase observations and associated statistical information, combining the arrays of said at least one auxiliary code filter with the arrays of the geometry filter and the ionosphere filters and the auxiliary ionosphere filters and the at least one code filter to obtain the combined array of ambiguity estimates for all carrier phase observations and associated statistical information, and combining the arrays of said at least one auxiliary code filter with the arrays of the geometry filter and the ionosphere filters and the auxiliary ionosphere filters and the at least one code filter and the additional filters to obtain the combined array of ambiguity estimates for all carrier phase observations and associated statistical information.

In accordance with some embodiments, each auxiliary code-carrier combination comprises one of: a combination of a third-frequency code observation with a first-and third-frequency carrier phase combination in which ionospheric bias of the first-and third-frequency carrier phase combination is matched to ionospheric bias of the third-frequency code observation, a combination of a second- and third-frequency code combination with a second- and third-frequency carrier phase combination in which ionospheric bias of the second- and third-frequency carrier phase combination is matched to ionospheric bias of the second- and third-frequency code combination, and a combination of a three-frequency narrow-lane code combination with a three-frequency wide-lane carrier phase combination in which ionospheric bias of the three-frequency wide-lane carrier-phase combination is matched to ionospheric bias of the three-frequency code combination. In accordance with some embodiments, one auxiliary code filter is provided per satellite of the first set of satellites. In accordance with some embodiments, the satellites are satellites of the Global Positioning System (GPS), wherein the first set of satellites have GPS carriers L1, L2 and L5 and wherein the second set of satellites have GPS carriers L1 and L2.

BRIEF DESCRIPTION OF THE DRAWINGS

These and other aspects and features of the present invention will be more readily understood from the embodiments described below with reference to the drawings, in which.

DETAILED DESCRIPTION

Overview

Figure 1:
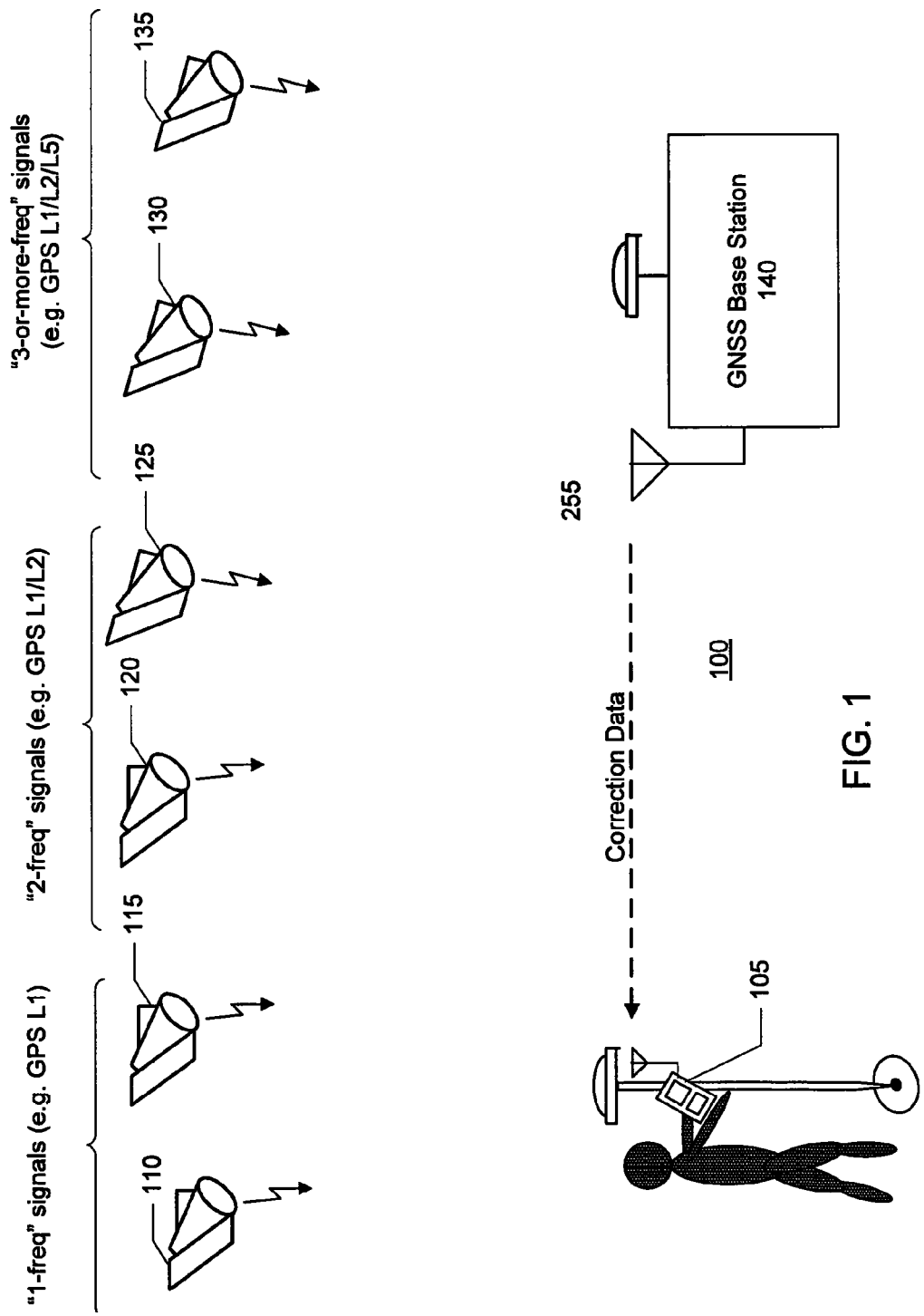
FIG. 1 schematically illustrates a real-time-kinematic positioning scenario using a GNSS rover capable of receiving GNSS signals with differing numbers of carrier frequencies.

Embodiments of the invention relate generally to any GNSS with a mixture of 2 and 3 or more frequency bands. For GPS, the three frequency bands are L1, L2 and L5. For GLONASS, the latest M satellites support L1 and L2 signals, however there are plans for GLONASS to support a new frequency band, denoted L3, located between 1164 and 1215 MHz on the GLONASS-K satellites.

The Galileo signal structure includes L1, E5A, E5B and E6 bands. The E6 band is a public regulated signal and therefore is unlikely to be available for general use. The E5A and E5B signals can be tracked separately and therefore Galileo can be used for three-frequency operation if desired. It is also possible to combine the E5A and B signals to produce carrier phase and code measurements with high accuracy (excellent multipath suppression). Hence Galileo can be used in either 2-, or 3-frequency modes.

The Chinese Beidou (Compass) satellite system is already under development, however details of the final signal structure are not known. One would expect that the system will provide a minimum of 2-frequency signals and hopefully 3 civil bands.

Further details of existing and planned GNSS signal spectra can be found in S. Lo et. al., 2006, *GNSS Album—Images and Spectral Signatures of the New GNSS Signals*, INSIDE GNSS, May/June 2008, pp. 46-56.

Various methods and apparatus are described for processing a mixture of two-frequency and three-or-more-frequency GNSS satellite signal data, or a mixture of one-frequency, two-frequency and three-or-more-frequency GNSS satellite signal data, to produce carrier phase ambiguity estimates as well as position estimates.

For purposes of illustration it is assumed that the satellite system in use is GPS and therefore the three frequencies are denoted L1, L2 and L5 respectively in the examples described below. The approaches presented can be readily translated to the signals of other GNSS satellite systems and of pseudolites without loss of generality.

Extended Dual-Frequency Scheme

Initially there will be very few GNSS satellites with the three-frequency (e.g., GPS satellites with L5) capabilities; the majority of GPS satellites will have L1 and L2 carrier phase and code observations available. During this stage, the third-frequency can be viewed as providing an extension to dual-frequency processing.

U.S. Pat. No. 7,432,853 describes schemes for multi-frequency carrier ambiguity estimation which the inventor collectively terms "Factorized Array Multi-Carrier Ambiguity Resolution" (or "FAMCAR"). The prior art section of U.S. Pat. No. 7,432,853 describes a scheme for two-frequency carrier ambiguity estimation. Implementations of such a two-frequency scheme may divide the filtering as shown in Table 1.

TABLE 1

Filter division for dual-frequency processing.

| Filter Component | Observation Type | Number of filters |
|---|---|---|
| Geometry | Minimum error L1/L2 carrier-phase combination | 1 |
| Iono | Geometry-free (iono-residual) carrier-phase | 1 per satellite |
| Code-carrier | Geometry-free, iono-free (e.g. wide-lane carrier-phase, narrow-lane code; or near-wide-lane carrier-phase, and L1-code) | 1 per satellite |

Some embodiments in accordance with the invention use observations of two frequencies of the three-or-more-frequency satellites' signals together with observations of the two frequencies of the two-frequency satellites' signals in a dual-frequency filtering approach. For example, the L1 and L2 signals of all GPS satellites are used in dual-frequency processing, even for those satellites which also broadcast the L5 signal. The third-frequency ambiguity (e.g., the L5 ambiguity) is estimated using auxiliary (three-frequency) ionospheric filter(s), and/or additional (Q) filter(s). In accordance with some embodiments of the invention, the additional (Q) filter(s) process a geometry-free, ionosphere-free carrier-phase combination to estimate carrier-phase ambiguities directly. The additional (Q) filters preferably use the "Quintessence" filter structure and "Quintessence" carrier-phase combinations described in U.S. Pat. No. 7,432,853.

Although there are no known plans to extend GPS or GLONASS to broadcast more than three-frequencies, GALILEO does support four frequency channels. The invention can accommodate estimation of carrier phase ambiguities when there are more than three frequencies available. The fourth frequency band is again treated as an extension to three-frequency processing. An optional additional ionospheric-filter, optional quintessence filter and optional auxiliary code filter can be added for each satellite with four frequencies. This allows the fourth-frequency ambiguity to be estimated in the filter combination step where the first-three frequency carrier phase ambiguities are estimated.

U.S. Pat. No. 7,432,853 also describes FAMCAR schemes for three-or more-frequency carrier ambiguity estimation, and for mixed two-frequency and three-or-more-frequency carrier ambiguity estimation. Ionosphere filters form an important part of the FAMCAR estimation scheme for two-or-more frequency ambiguity estimation. On short baselines, ionospheric bias is tightly constrained and this information helps to link the estimation of the L1, L2 and L5 ambiguities. The additional (Q, or Quintessence) filters do not add the same level of information as three-frequency ionospheric filters. On long baselines, where the ionospheric bias is not as well known, the three-frequency ionospheric filters still provide useful constraint of the relationship between L1, L2 and L5 ambiguities. The L1, L2 and L5 ionospheric bias constraint is important for successful integer carrier phase ambiguity resolution. Because the L1, L2 and L5 carriers are coherently derived from the same fundamental frequency reference at the satellite, there is an intrinsic relationship between the L1, L2 and L5 ambiguities. This relationship gives rise to a search space where the coincidence of L1, L2 and L5 wavefronts only occurs at particular harmonics of L1, L2 and L5.

In accordance with some embodiments of the invention, an additional (Q, or "Quintessence") filter is added to model the third and subsequent carriers for each three-or-more-frequency satellite when available, e.g, the GPS L5 frequency.

In accordance with some embodiments of the invention, an auxiliary code filter using a code-carrier combination is added to make use of the code-observation on the third frequency, e.g., the GPS L5 frequency. The GPS L5 signal structure will provide code observations with enhanced precision and therefore will improve the overall estimation process when it is included.

Selection of the observation type for the third-frequency is important. In accordance with some embodiments of the invention, the three-frequency ionosphere filters use a geometry-free, minimum-error, ionospheric combination. In accordance with some embodiments of the invention, the additional (Q, or "Quintessence") filters use three frequencies to form a geometry-free, iono-free phase combination. In accordance with some embodiments of the invention the code-carrier combination of the auxiliary code filters uses the third frequency code observation (e.g., GPS L5 code observation) with a three-frequency phase combination (e.g., a combination of GPS L1, L2 and L5 observations) that has an ionospheric bias identical to the ionospheric bias of the code observation (e.g., a GPS L1/L2/L5 combination with ionospheric bias matched to the ionospheric bias of the GPS L5 code observation).

Table 2A, Table 2B and Table 2C illustrate alternative filtering schemes using a third-frequency as an extension to dual-frequency processing, in accordance with embodiments of the invention.

TABLE 2A

Filter division for dual-frequency processing with three-frequency extension (third-frequency estimation via additional (Q) filter/s and optional third-frequency code-carrier filter/s)

| Filter Component | Observation Type | Number of filters |
|---|---|---|
| Geometry | Minimum error L1/L2 carrier-phase | 1 |
| Iono | Geometry-free (iono-residual) | 1 per satellite |
| Code (code-carrier) | Geometry-free, iono-free (e.g. wide-lane carrier-phase, narrow-lane code; or near-wide-lane carrier-phase, and L1-code) | 1 per satellite |
| Additional (Q) ("Quintessence") | Geometry-free, iono-free carrier-phase combination | 1 per (3-freq) satellite |
| Optional auxiliary code (code-carrier) filter for third-frequency | Geometry-free, iono-free code-carrier combination | 1 per (3-freq) satellite |

TABLE 2B

Filter division for dual-frequency processing with three-frequency extension (third-frequency estimation via three-frequency-ionosphere filter/s and optional third-frequency code-carrier filter/s)

| Filter Component | Observation Type | Number of filters |
|---|---|---|
| Geometry | Minimum error L1/L2 carrier-phase | 1 |
| Iono | Geometry-free (iono-residual) | 1 per satellite |
| Code (code-carrier) | Geometry-free, iono-free (e.g. wide-lane carrier-phase, narrow-lane code; or near-wide-lane carrier-phase, and L1-code) | 1 per satellite |
| Auxiliary Iono | Geometry-free ionospheric carrier-phase combination (3-freq) | 1 per (3-freq) satellite |
| Optional auxiliary code (code-carrier) filter for third-frequency | Geometry-free, iono-free code-carrier combination | 1 per (3-freq) satellite |

TABLE 2C

Filter division for dual-frequency processing with three-frequency extension (third-frequency estimation via additional (Q) filter/s, 3-frequency-iono filter/s, and optional third-frequency code-carrier filter/s)

| Filter Component | Observation Type | Number of filters |
|---|---|---|
| Geometry | Minimum error L1/L2 carrier-phase | 1 |
| Iono | Geometry-free (iono-residual) | 1 per satellite |
| Code (code-carrier) | Geometry-free, iono-free (e.g. wide-lane carrier-phase, narrow-lane code; or near-wide-lane carrier-phase, and L1-code) | 1 per satellite |
| Additional (Q) ("Quintessence") | Geometry-free, iono-free carrier-phase combination | 1 per (3-freq) satellite |
| Auxiliary Iono | Geometry-free ionospheric carrier-phase combination (3-freq) | 1 per (3-freq) satellite |
| Optional auxiliary code (code-carrier) filter for third-frequency | Geometry-free, iono-free code-carrier combination | 1 per (3-freq) satellite |

Seamless One- Two- Three-Frequency Processing

Traditionally the GPS L1 C/A-code band has been treated as the primary signal for civilian use, particularly given that tracking the GPS L2 signal without knowledge of the Y-code leads to less L2 signal availability than L1. The receiver has a more difficult time maintaining phase lock on the L2 signal than on the L1 signal, especially under difficult conditions of weak signal, multipath, etc., because the Y-code modulated on the L2 signal is not known to the receiver, while the C/A code modulated on the L1 signal is known to the receiver. When a dual-frequency receiver loses lock on one signal (e.g., GPS L2) of a dual-frequency satellite, that satellite's data drops out of the minimum-error dual-frequency (e.g., GPS L1/L2) geometry filter process. The dual-frequency filter division scheme described with reference to Table 1 processes only the signals of those satellites for which two-frequency observations are available. The dual-frequency filter division schemes with three-frequency extension described with reference to Table 2A, Table 2B and Table 2C process the signals of all satellites for which two-frequency observations are available as in the dual-frequency filter division scheme of Table 1 and also process combinations using the third frequency.

Some embodiments in accordance with the invention provide for a filter division scheme which accommodates single-, dual- and triple-frequency observations, as summarized in Table 3.

TABLE 3

Filter division for single-, dual- and triple-frequency processing

| Filter Component | Observation Type | Number of filters | Number of bands available |
|---|---|---|---|
| Geometry | L1-only carrier-phase plus L1-only code | 1 | 1 |
| Iono | Geometry-free: iono-residual carrier-phase | 1 per satellite | 2 |
| Optional code (code-carrier) filter for second frequency | Geometry-free, iono-free code-carrier combination | 1 per (2-freq) satellite | |
| Additional (Q) ("Quintessence") | Geometry-free, iono-free carrier-phase combination | 1 per (3-freq) satellite | 3 |
| Auxiliary Iono | Geometry-free ionospheric carrier-phase combination (3-freq) | 1 per (3-freq) satellite | |
| Optional auxiliary code (code-carrier) filter for third-frequency | Geometry-free, iono-free code-carrier combination | 1 per (3-freq) satellite | |

Some embodiments of the invention in accordance with Table 3 update the geometry filter using the combination of L1-only carrier-phase observations (e.g., in meters) and L1-only code observations. This observation type is sometimes called the GRAPHIC combination; it is free from ionospheric bias. For more on the GRAPHIC combination, see B. REMONDI, FINAL REPORT: INVESTIGATION OF GLOBAL POSITIONING SYSTEM SINGLE FREQUENCY HARDWARE FOR THE U.S. ENVIRONMENTAL PROTECTION AGENCY, EPA Reference DW13936132-01-0, April 1994; T. YUNCK, *Orbit Determination*, in GLOBAL POSITIONING SYSTEM: THEORY AND APPLICATIONS VOLUME 2, Eds. B. W. Parkinson, J. J. Spilker Jr., PROGRESS IN ASTRONAUTICS AND AERONAUTICS VOLUME 164, American Institute of Aeronautics and Astronautics, Inc., Washington, D.C., U.S.A., 1996, pp. 559-592, at pp. 581-583; A. Simsky, Standalone real-time navigation algorithm for single-frequency ionosphere-free positioning based on dynamic ambiguities (DARTS-SF), and O. MONTENBRUCK et al., *Phoenix-XNS—A Miniature Real-Time Navigation System for LEO Satellites*, NAVITEC 2006, 11-13 Dec. 2006, 8 pp.

The derivation of the GRAPHIC combination begins with the L1 phase and code observations given as follows:

$$\lambda_{L1}\phi_{L1} = \rho - \frac{I}{f_{L1}^2} + \beta_{L1} + \lambda_{L1} + n_{L1} \qquad (1)$$

$$r_{L1} = \rho + \frac{I}{f_{L1}^2} + b_{L1} \qquad (2)$$

Where:

$\phi_{L1}$ first-frequency (e.g., L1) carrier phase observation (cycles), $\rho$ user-satellite geometric range term (meters), $\lambda_{L1}$ first-frequency (e.g., L1) wavelength (meters)

I ionospheric bias for the L1 band, $f_{L1}$ first-frequency (e.g., L1) frequency (hz)

$\beta_{L1}$ first-frequency (e.g., L1) carrier phase multipath (meters), $n_{L1}$ first-frequency (e.g., L1) carrier phase ambiguity (cycles), $r_{L1}$ first-frequency (e.g., L1) pseudorange observation (meters)

$b_{L1}$ first-frequency (e.g., L1) code multipath

Equation (2) can be used to derive an expression for the ionospheric bias term:

$$\frac{I}{f_{L1}^2} = r_{L1} - \rho - b_{L1} \quad (3)$$

Inserting the result from (3) into (1):

$$\lambda_{L1}\phi_{L1} = \rho - (r_{L1} - \rho - b_{L1}) + \beta_{L1} + \lambda_{L1}n_{L1} \quad (4)$$

Rearranging (4) leads to the desired L1 code/phase combination:

$$\frac{\lambda_{L1}\phi_{L1} + r_{L1}}{2} = \rho + \frac{b_{L1} + \beta_{L1}}{2} + \frac{\lambda_{L1}n_{L1}}{2} \quad (5)$$

The second term on the right-hand side of (5) corresponds to the code plus phase multipath. The geometry filter includes position and clock terms, plus a multipath and phase ambiguity state for each satellite used. Even without the availability of dual-frequency data, the results from the single-frequency (e.g., L1-only) geometry filter provide convergent estimates of single-frequency (e.g., L1-only) ambiguities.

When dual-frequency carrier phase observations are available for a particular satellite, ionosphere filters are used in accordance with some embodiments of the invention to model the single-difference ionospheric bias and to estimate a carrier phase ambiguity term. The corresponding observation model is given by:

$$\lambda_{L1}\phi_{L1} - \lambda_{L2}\phi_{L2} = \left(\frac{I}{f_{L2}^2} - \frac{I}{f_{L1}^2}\right) + (\lambda_{L1}n_{L1} - \lambda_{L2}n_{L2}) \quad (6)$$

Where the notation above applies and further:

$\phi_{L2}$ second-frequency (e.g., L2) carrier phase observation (cycles), $\lambda_{L2}$ second-frequency (e.g., L2) wavelength (meters)

$f_{L2}$ second-frequency (e.g., L2) frequency (hz)

For the dual-frequency case, combining the arrays of factorized (FAMCAR) filters produces first-frequency (e.g., L1) ambiguities for all satellites plus first- and second-frequency (e.g., L1 and L2) ambiguities for those satellites for which dual-frequency observables are available. In accordance with some embodiments of the invention, code observations from the second frequency (e.g., L2) are optionally processed when available, in the manner described for the first frequency. The second-frequency (e.g., L2) code observations can be filtered with a dual-frequency (e.g., L1/L2) carrier-phase, combination which has an ionospheric bias equal to the ionospheric bias of the second-frequency (e.g., L2-code) observation.

For those satellites which are tracked with three frequencies, carrier-phase observation data from the third frequency (e.g., L5), are used in an additional (Q) ("Quintessence") filter in accordance with some embodiments of the invention. An additional code (code-carrier) filter is used to improve the estimation of the ambiguities in accordance with some embodiments of the invention. Further details about the additional (Q) ("Quintessence") filters are found in U.S. Pat. No. 7,432,853.

Suboptimal Factorization

An underlying principle of the FAMCAR scheme described in U.S. Pat. No. 7,432,853 is that the results from the various filters are orthogonal. That is, the geometry filter, ionosphere filter/s, code-carrier filter/s and "Quintessence" filters are assumed to produce results that are mutually independent.

In contrast, some embodiments in accordance with the present invention employ factorization schemes that have desirable characteristics yet relax the orthogonality principle. For example, for the dual-frequency processing case, the geometry filter described in U.S. Pat. No. 7,432,853 processes dual-frequency (e.g., L1/L2) minimum-error-phase data; however alternatives in accordance with some embodiments of the present invention process single-frequency (e.g., L1-only) data in the geometry filter. On short baselines, the dual-frequency (e.g., L1/L2) minimum-error carrier-phase combination essentially becomes single-frequency (e.g., L1-only) carrier-phase; hence if the geometry filter strictly processes single-frequency (e.g., L1-only) data then it will provide very close to optimal results on short baselines. On long baselines, the dual-frequency (e.g., L1/L2) minimum error phase combination approaches the iono-free carrier-phase combination and therefore the results from a single-frequency (e.g., L1-only) geometry filter will become correlated with the results from the iono-filters. Empirical tests show that acceptable results can still be obtained if the correlation between the L1-only geometry-filter output and the L1/L2 iono-filter output is ignored.

An alternative to using an L1-only Geometry filter configuration is to permanently run the Geometry-filter in an iono-free mode. This technique, though not optimal, has been shown to produce acceptable performance. Normally the minimum error carrier-phase combination needs to be adjusted for the prevailing baseline length (and assumed changes in iono bias), each adjustment translates into a geometry-filter reset. Fixed L1-only or iono-free geometry-filter processing negates the reset problem and simplifies the factorized array processing. Furthermore, if L1-only phase is used, there is no requirement to have L2 data available for every satellite used to update the geometry-filter, and this confers improved solution availability.

Table 4 gives an example of a filter scheme in accordance with an embodiment of the invention.

TABLE 4

Example of filter scheme

| Filter Type | 2-Freq | 3-Freq | Notes |
|---|---|---|---|
| Geometry | minimum-error carrier-phase combination | — | single-geometry filter used for all satellites |
| Iono | ionospheric dual-frequency carrier-phase combination | — | bank of filters with 1 filter per satellite |
| Code (code-carrier) | L1-code with L1/L2 phase combination having iono bias matched to L1-code | — | bank of filters with 1 filter per satellite |
| Auxiliary Iono | — | minimum-error 3-frequency ionospheric carrier-phase combination | bank of filters with 1 filter for each 3-frequency satellite |

TABLE 4-continued

Example of filter scheme

| Filter Type | 2-Freq | 3-Freq | Notes |
|---|---|---|---|
| Additional (Q) "Quintessence" | — | geometry-free, iono-free 3-frequency carrier-phase combination | bank of filters with 1 filter for each 3-frequency satellite |
| Auxiliary Code (code-carrier) | — | L5-code with L1/L5 carrier-phase combination having iono bias matched to L5 code | bank of filters with 1 filter for each 3-frequency satellite |

Table 5 summarizes data combinations suitable for mixed one-, two-three-frequency filtering of GPS signals in accordance with some embodiments of the invention. Comparable combinations are used for other GNSS.

TABLE 5

Filter separation for 1-, 2-, 3-frequency processing

| Filter Type | 1-Freq | 2-Freq | 3-Freq | Notes |
|---|---|---|---|---|
| Geometry | L1-only carrier-phase OR L1 carrier-phase/L1 code OR L1-GRAPHIC (carrier-phase/code) combination | — | — | single geometry filter used for all satellites |
| Iono | | ionospheric dual-frequency carrier-phase combination | — | bank of filters with 1 filter per 2-freq satellite |
| Code (code-carrier) | | L1-code with L1/L2 phase combination having iono bias matched to L1-code OR L1/L2 narrow-lane-code & L1/L2 wide-lane carrier-phase combination | — | bank of filters with 1 filter per 2-freq satellite |
| Auxiliary Iono | — | — | minimum-error 3-frequency ionospheric carrier-phase combination | bank of filters with 1 filter for each 3-frequency satellite |
| Additional (Q) "Quintessence" | — | — | geometry-free, iono-free 3-frequency carrier-phase combination | bank of filters with 1 filter for each 3-frequency satellite |
| Auxiliary Code (code-carrier) | — | — | L5-code with L1/L5 phase combination with matched iono bias to L5 code OR L1/L2/L5 narrow-lane code with L1/L2/L5 phase combination with matched iono OR L2/L5-code with iono-matched L2/L5 carrier-phase | bank of filters with 1 filter for each 3-frequency satellite |

FIG. 1 schematically illustrates a real-time-kinematic positioning scenario 100 using a GNSS rover 105 capable of receiving differing numbers of GNSS signals from GNSS satellites in view. For example, rover 105 receives only a single-frequency signal (e.g., GPS L1) from satellites 110 and 115, possibly due to weak signal or multipath or other factors, receives dual-frequency signals (e.g., GPS L1 and L2) from satellites 120 and 125, and receives three-or-more-frequency signals (e.g., GPS L1 and L2 and L5) from satellites 130 and 135. Similarly, GNSS base station 140 receives signals from some or all of the same satellites, and may receive more or fewer frequencies from each satellite.

Figure 2:
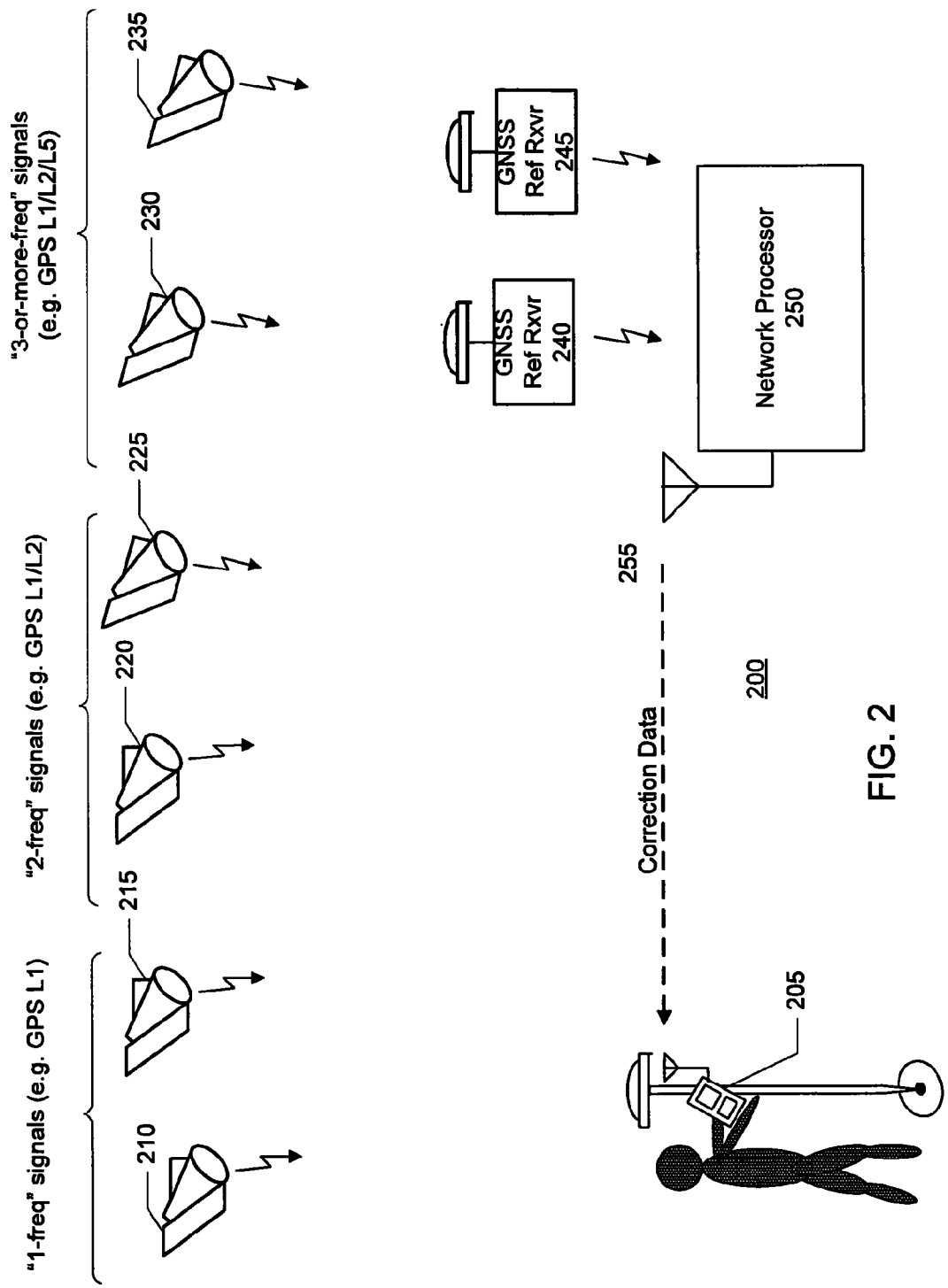
FIG. 2 schematically illustrates a network positioning scenario using a GNSS rover capable of receiving GNSS signals with differing numbers of carrier frequencies.

FIG. 2 schematically illustrates a network positioning scenario 200 using a GNSS rover capable of receiving GNSS signals with differing numbers of carrier frequencies. For example, rover 205 receives only a single-frequency signal (e.g., GPS L1) from satellites 210 and 215, possibly due to weak signal or multipath or other factors, receives dual-frequency signals (e.g., GPS L1 and L2) from satellites 220 and 225, and receives three-or-more-frequency signals (e.g., GPS L1 and L2 and L5) from satellites 230 and 235. Similarly, GNSS reference stations 240, 245 (and possibly others not shown) receives signals from some or all of the same satellites, and may receive more or fewer frequencies from each satellite. A network processor 250 collects the data from the reference receivers, prepares correction data and transmits the correction data to rover 205 via a communications link 255.

Figure 3:
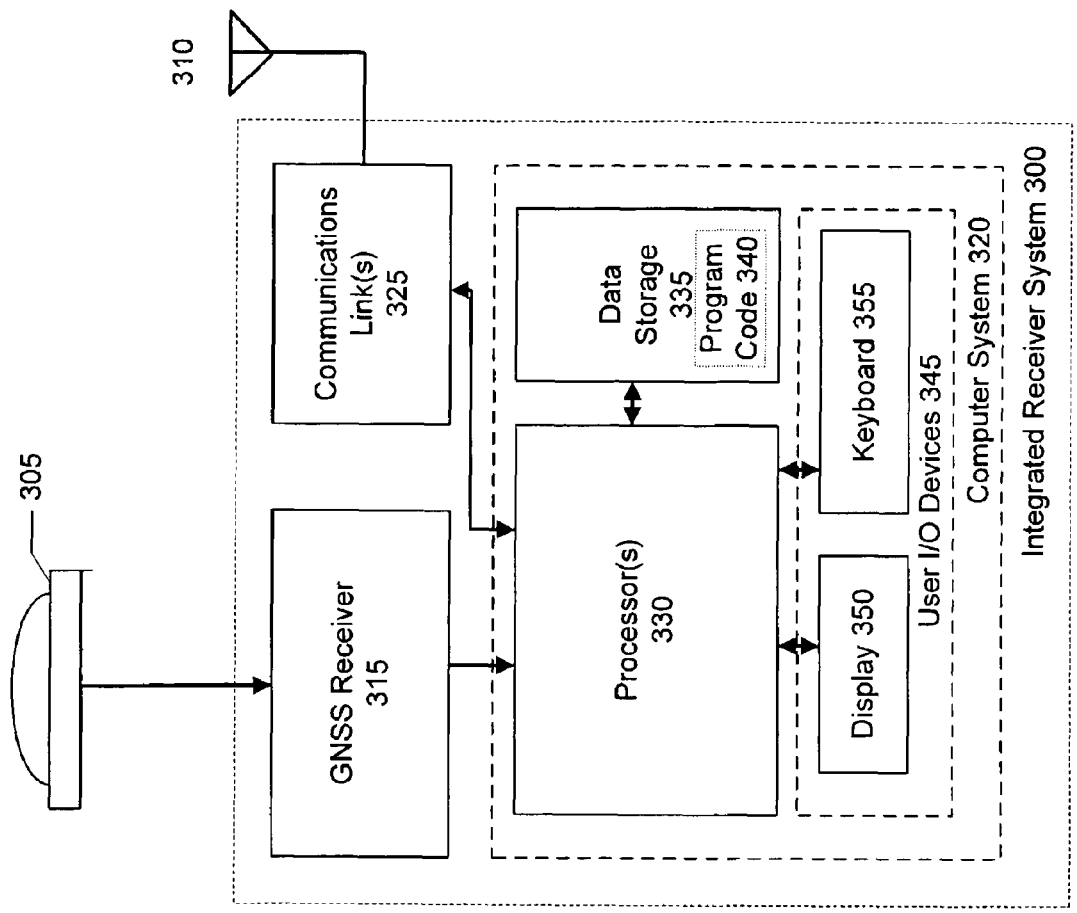
FIG. 3 is a block diagram of a typical integrated GNSS receiver system.

FIG. 3 is a block diagram of a typical integrated GNSS receiver system 300 with GNSS antenna 305 and communications antenna 310. Receiver system 300 can serve as a rover or base station or reference station. Receiver system 300 includes a GNSS receiver 315, a computer system 320 and one or more communications links 325. Computer system 320 includes one or more processors 330, one or more data storage elements 335, program code 340 for controlling the processor(s) 330, and user input/output devices 345 which may include one or more output devices 350 such as a display or speaker or printer and one or more devices 355 for receiving user input such as a keyboard or touch pad or mouse or microphone.

Figure 4:
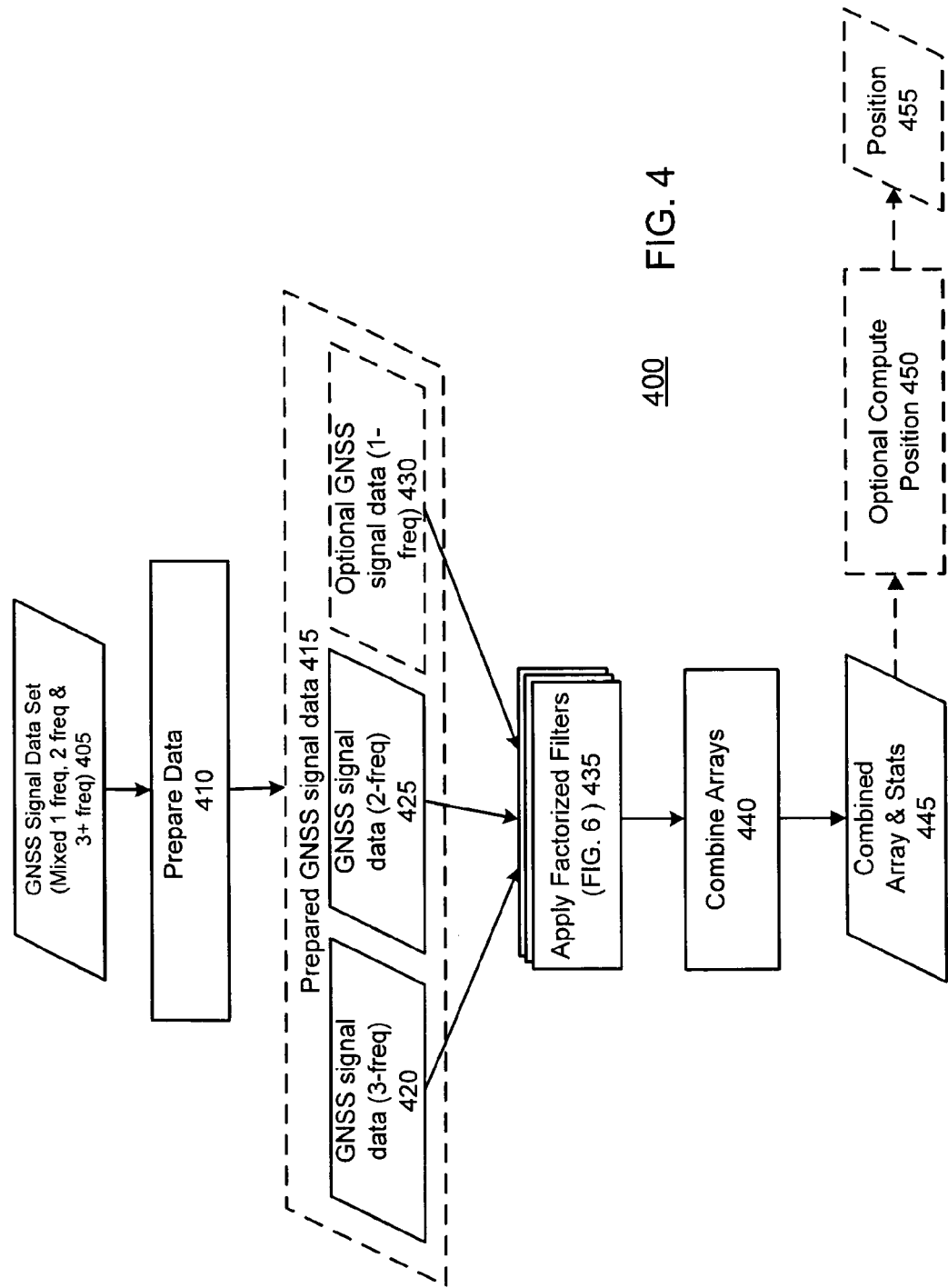
FIG. 4 schematically illustrates high-level GNSS signal processing flow in accordance with some embodiments of the invention.

FIG. 4 schematically illustrates high-level GNSS signal processing flow 400 in accordance with some embodiments of the invention. A GNSS signal data set 405 is a set of observations obtained by receiving signals of multiple satellites at a receiver. GNSS signal data set 405 is supplied to an element 410 which prepares the data for filtering. The resulting prepared data 415 includes three-or-more-frequency signal data 420, two-frequency signal data 425 and optional single-frequency signal data 430.

In accordance with some embodiments, the prepare data component 410 involves some or all of the following steps: (1) storage (buffering) of rover epoch GNSS observation data, (2) time-synchronization of reference and rover epoch GNSS observation data once the reference data is received, (3) application of antenna correction models to base and rover observations, (4) formation of single- (between base/rover) difference pseudorange and carrier phase observations for each GNSS frequency band, (5) application of tropospheric correction models to single-difference observations, (6) application of ionospheric correction models to single-difference observations, (7) form linear combination(s) of carrier phase and pseudorange observations for each satellite—e.g. form single-difference iono-free carrier phase combination, single-difference narrow-lane pseudo-range combination, etc. The linear combinations possess certain important characteristics that are exploited during the position calculations. For example iono-free combinations are essentially free of ionospheric bias. Single-differencing of GNSS observations helps to reduce the impact of satellite dependent error sources. Satellite clock errors are essentially removed by single-difference formation between base and rover receiver data which was collected at the same time instant (epoch).

Prepared GNSS signal data 415 is supplied to an element 435 which applies a set of factorized filters 500 (FIG. 5) to the prepared data 415. Features and variations of the factorized filters 500 are described below. Arrays of data produced by applying filters 500 to prepared data 415 are combined in an element 440 to form a combined array of ambiguity estimates for all carrier-phase observations and associated statistical information for all transmitters (e.g. for all observed GNSS satellites and/or pseudolites). Array 445 is supplied to an option position-computation element 450 which computes a receiver position 455 for the time of the observations. Position 455 can be computed as a float solution, for example, or other type of position solution such as fixed, a combination of float and fixed, or determined using a weighted average of ambiguities as described in U.S. Provisional Application for Patent 61/189,382 or using techniques described in S. VERHAGEN, *The GNSS integer ambiguities: estimation and validation*, Delft University of Technology, 2004, ISBN 90-804147-4-3, also published in PUBLICATIONS ON GEODESY 58, Delft, 2005, ISBN-13: 978 90 6132 290 0, ISBN-10: 90 6132 290, incorporated herein by this reference.

Figure 5:
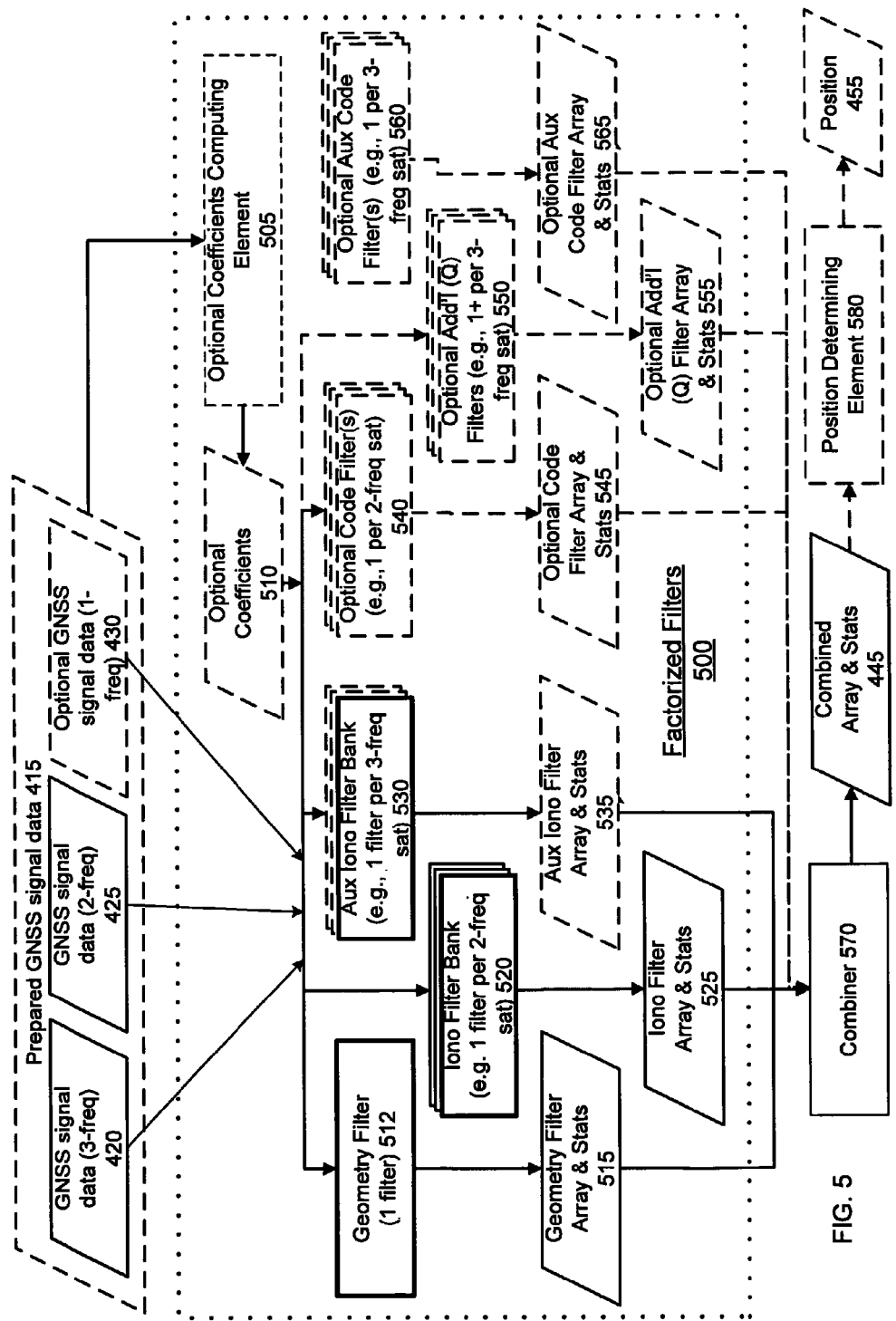
FIG. 5 schematically illustrates a filter architecture in accordance with some embodiments of the invention.

FIG. 5 schematically illustrates a filter architecture in accordance with some embodiments of the invention, suitable for carrying out filter processes in accordance with some embodiments of the invention. A prepared GNSS signal data set, such as prepared GNSS signal data set 415, is supplied to factorized filters 500 which contain elements for carrying out sub-processes. Optional element 505 computes optional coefficients 510 from the prepared data. The prepared data set and the optional coefficients 510 are supplied to sub-filters which include: a single geometry filter 512 and a geometry-free ionosphere filter bank 520 having for example one filter per observed two-frequency satellite. Some embodiments in accordance with the invention include an auxiliiary geometry-free ionosphere filter bank 530 having for example one filter per observed three-frequency satellite. Some embodiments in accordance with the invention include one or more optional code (code-carrier) filters 540 such as one such filter per observed two-frequency satellite; and/or one or more optional additional (Q) ("Quintessence") filter banks 550 in which each filter bank has for example one filter per observed three-frequency satellite; and/or one or more optional auxiliary code filter banks 560 in which each filter bank has one filter per observed three-frequency satellite.

Geometry filter 512 produces an array of geometry-filter ambiguity estimates with associated statistical information 515. Geometry-free ionosphere filter bank 520 produces an array of iono-filter ambiguity estimates with associated statistical information 525. Auxiliiary geometry-free ionosphere filter bank 530, if provided, produces an array of auxiliary-iono-filter ambiguity estimates with associated statistical information 535. Optional code filter/s 540, if provided, produce an array of optional code-filter ambiguity estimates with associated statistical information 545. Optional additional (Q) ("Quintessence") filters 550, if provided, produce an array of optional additional-(Q) filter ambiguity estimates with associated statistical information 555. Optional auxiliary code filter/s 560, if provided, produce an array of optional auxiliary-code-filter ambiguity estimates with associated statistical information 565. The arrays produced by the sub-filters are supplied to a combiner 570 which provides combined array of ambiguity estimates for all observations with associated statistical information 445. Array 445 is optionally supplied to a position-determining element 580 to carry out a process as at 450 to compute a position 455.

The number of additional (Q) ("Quintessence") filter banks 550 is for example two less than the number of observed satellite carrier frequencies. For example, a single bank of additional (Q) filters is provided for satellites having three observed carrier frequencies, with up to one filter per three-frequency satellite, and two banks of (Q) filters are provided for satellites having four observed carrier frequencies, each bank having up to one filter per four-frequency satellite.

A number of banks of code filter/s 540 can be provided up to the number of observed carrier frequencies. For example, one or two banks of code filter/s 540 can be provided for satellites having two observed carrier frequencies, each bank having up to one filter per two-frequency satellite. A number of banks of auxiliary code filter/s 560 can be provided up to the number of observed carrier frequencies. For example, one or two or three banks of auxiliary code filter/s 560 can be provided for satellites having three observed carrier frequencies, each bank having up to one filter per three-frequency satellite. Similarly, any number from one to four code filter banks is provided for a satellites having four carrier frequencies, each bank having up to one filter per four-frequency satellite.

Figure 6:
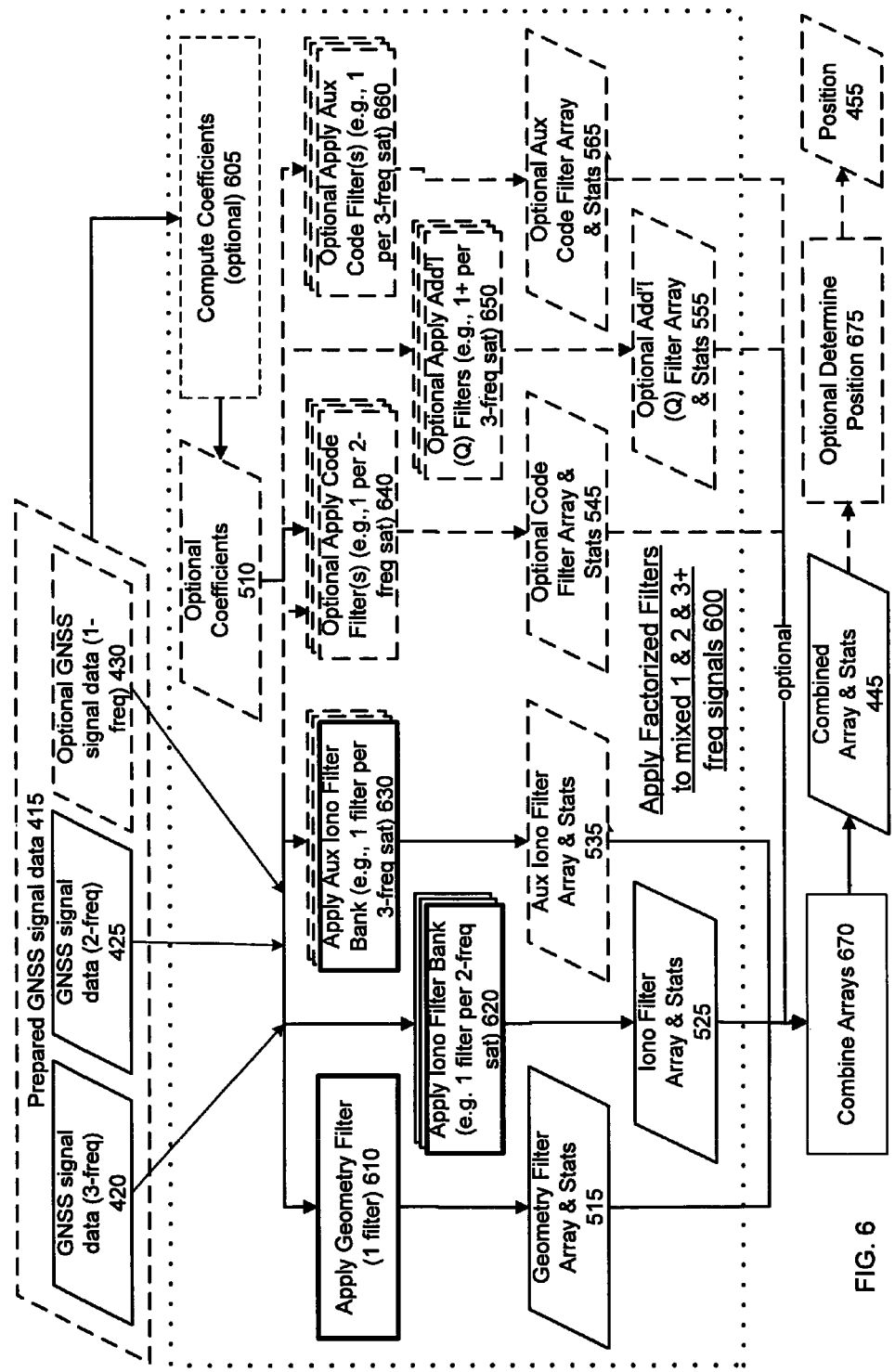
FIG. 6 schematically illustrates a process flow in accordance with some embodiments of the invention.

FIG. 6 schematically illustrates a process flow in accordance with some embodiments of the invention. At 605 coefficients 510 are optionally computed from prepared signal data 415. At 610 a geometry filter such as geometry filter 512 is applied to the prepared signal data 415 to produce the array of geometry-filter ambiguity estimates with associated statistical information 515. At 620 one or more geometry-free iono filter bank/s 620 such as geometry-free ionosphere filter bank/s 520 are applied to the prepared signal data 425 of the two-frequency satellite observations to produce the array of iono-filter ambiguity estimates with associated statistical information 525. At 630 one or more banks of auxiliary geometry-free ionosphere filter/s, if provided, such as auxiliary ionosphere filter banks 530 are applied to the three-frequency satellite observations to produce the array of auxiliary-iono-filter ambiguity estimates with associated statistical information 535. At 640, the optional code filter/s 540, if provided, are applied to the two-frequency satellite observations to produce the array of optional code-filter ambiguity estimates with associated statistical information 545. At 650, the optional additional (Q) ("Quintessence") filters 550, if provided, are applied to the three-or-more-frequency satellite observations to produce the array of optional additional-(Q) filter ambiguity estimates with associated statistical information 555. At 660 the optional auxiliary code filter/s 560, if provided, are applied to the three-or-more-frequency satellite observations to produce the array of optional auxiliary-code-filter ambiguity estimates with associated statistical information 565. At 670 the arrays produced by the sub-filters are supplied to combiner 570 to provide the combined array of ambiguity estimates for all observations with associated statistical information 445. At 675 the combined array 445 is optionally supplied to position-determining element 675 to carry compute the position 455.

Figure 7:
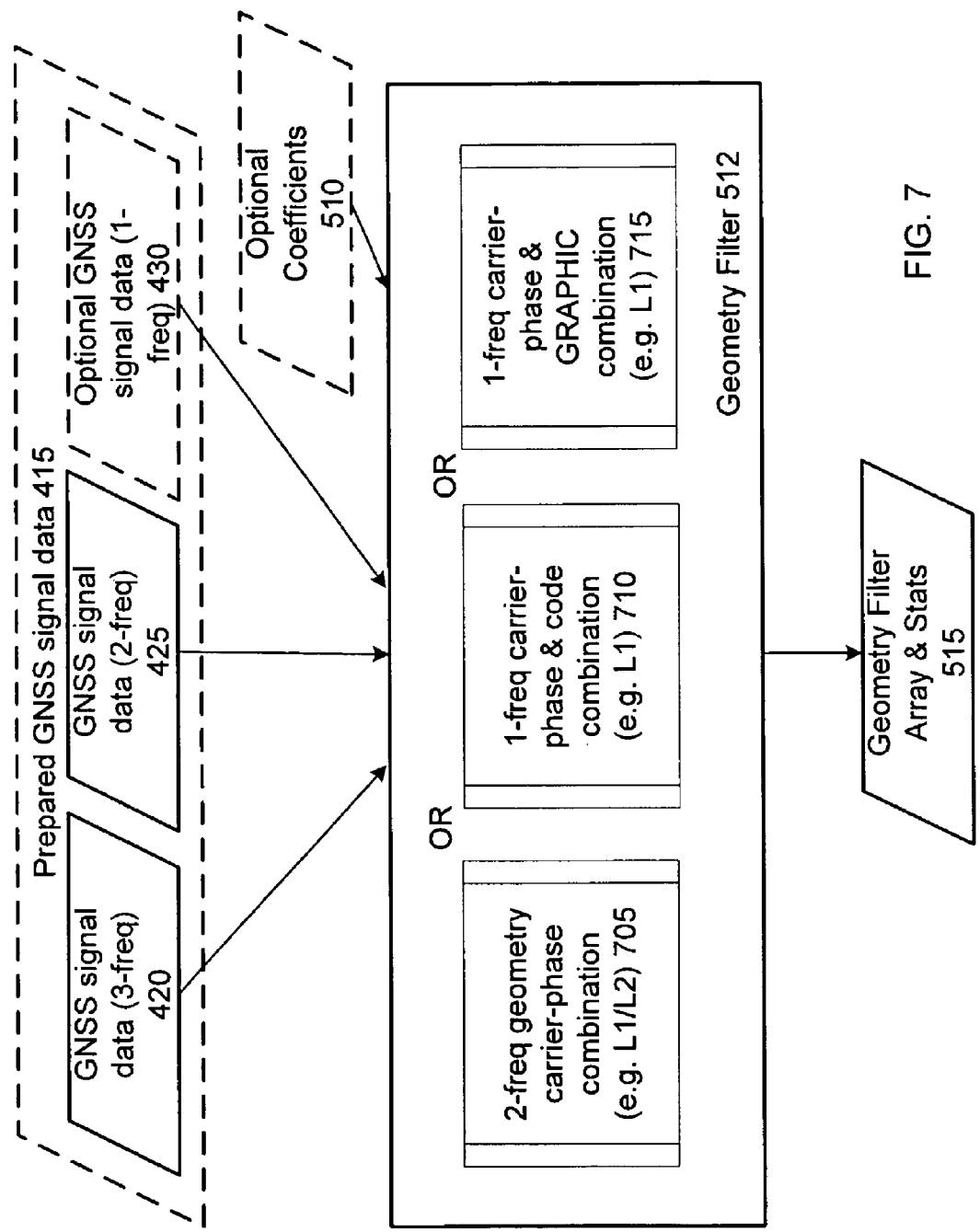
FIG. 7 schematically illustrates optional geometry filter architectures in accordance with some embodiments of the invention.

FIG. 7 schematically illustrates alternate geometry filter architectures in accordance with some embodiments of the invention. In one embodiment, geometry filter 512 produces array 515 by applying to the prepared three-or-more-frequency data 420 and two-frequency data 425 a two-frequency geometry carrier-phase combination 705 (e.g., minimum-error GPS L1/L2). In one embodiment, geometry filter 512 produces array 515 by applying to the prepared three-or-more-frequency data 420 and two-frequency data 425 and one-frequency data 430 a single-frequency carrier-phase and code combination (e.g., GPS L1) 710. In one embodiment, geometry filter 512 produces array 515 by applying to the prepared three-or-more-frequency data 420 and two-frequency data 425 and one-frequency data 430 a single-frequency carrier-phase and GRAPHIC combination 715 (e.g., GPS L1).

Figure 8:
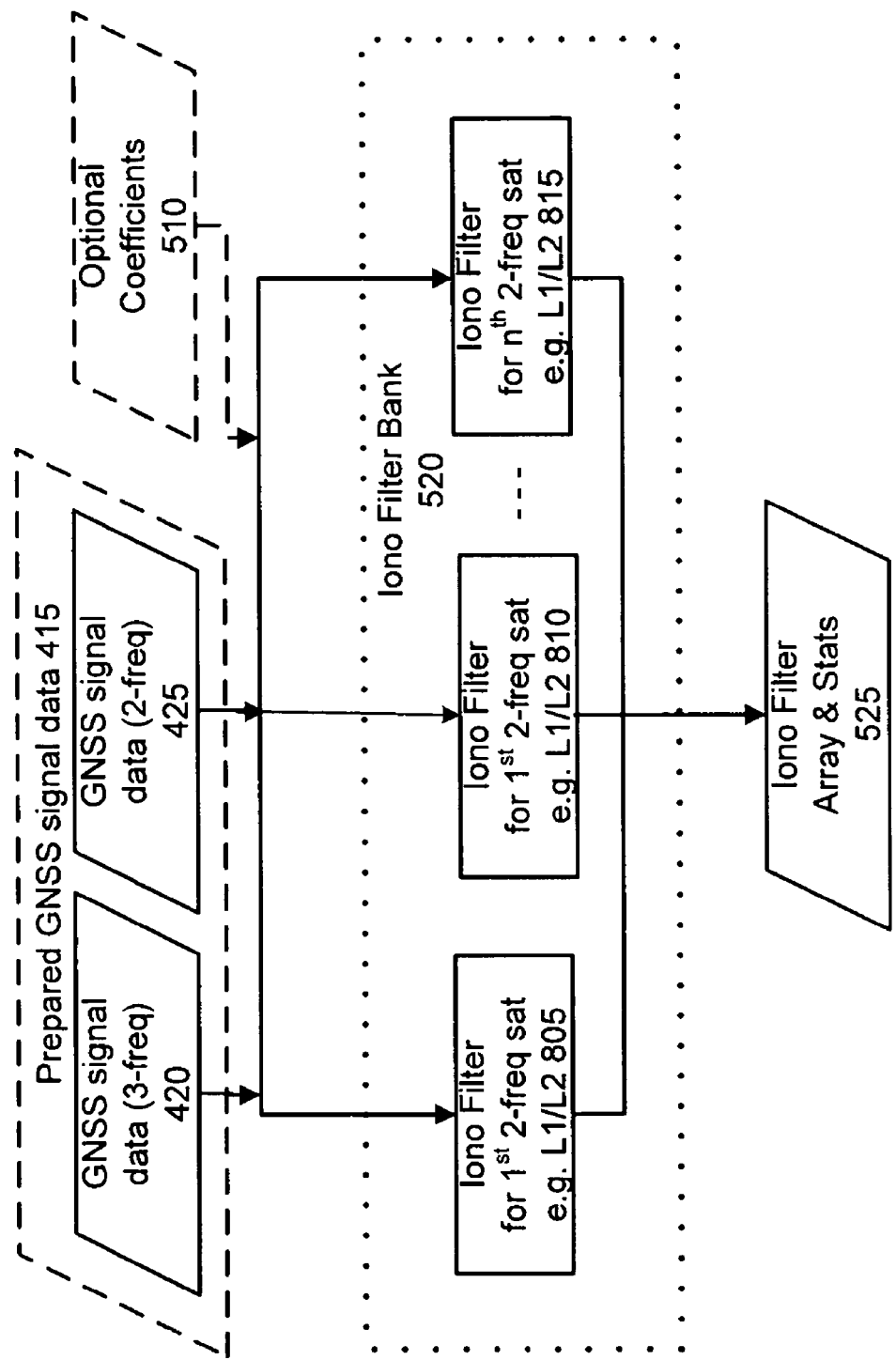
FIG. 8 schematically illustrates a two-frequency ionosphere filter architecture in accordance with some embodiments of the invention.

FIG. 8 schematically illustrates a two-frequency ionosphere filter architecture in accordance with some embodiments of the invention. In one embodiment, ionosphere filter bank 520 produces array 525 by applying to the prepared three-or-more-frequency data 420 and two-frequency data 425 of the data for each satellite having two-or-more-frequency observations a respective ionosphere filter 805, 810, . . . 815. Ionosphere filters 805, 810, . . . 815 in accordance with some embodiments use a two-frequency geometry-free ionospheric carrier-phase combination (e.g., GPS L1/L2).

Figure 9:
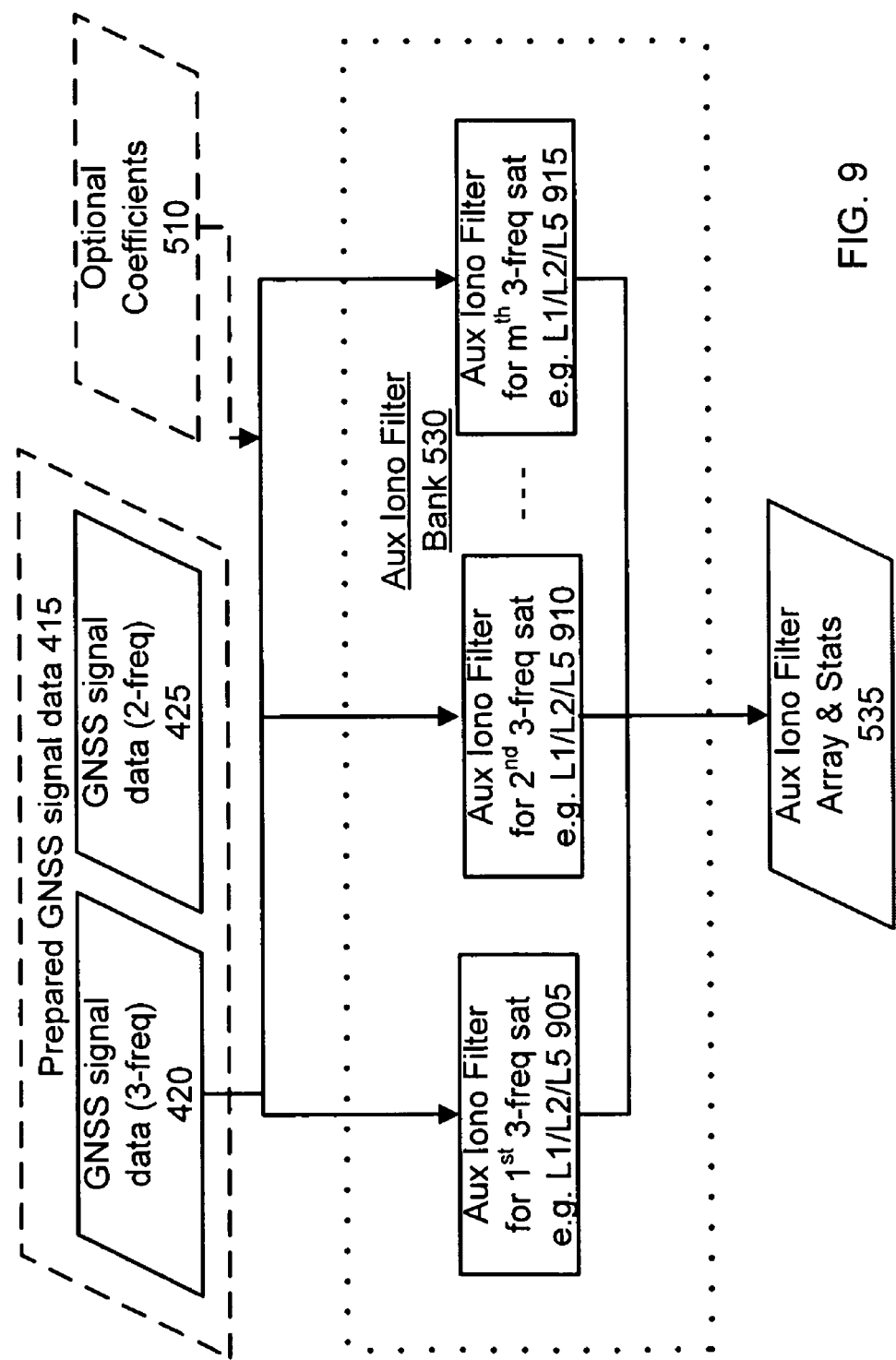
FIG. 9 schematically illustrates an auxiliary three-or-more-frequency ionosphere filter architecture in accordance with some embodiments of the invention.

FIG. 9 schematically illustrates an auxiliary three-or-more-frequency ionosphere filter architecture in accordance with some embodiments of the invention. In one embodiment, auxiliary ionosphere filter bank 530 produces array 535 by applying to the prepared data 420 for each satellite having three-or-more-frequency observations a respective auxiliary ionosphere filter 905, 910, . . . 915.

Figure 10:
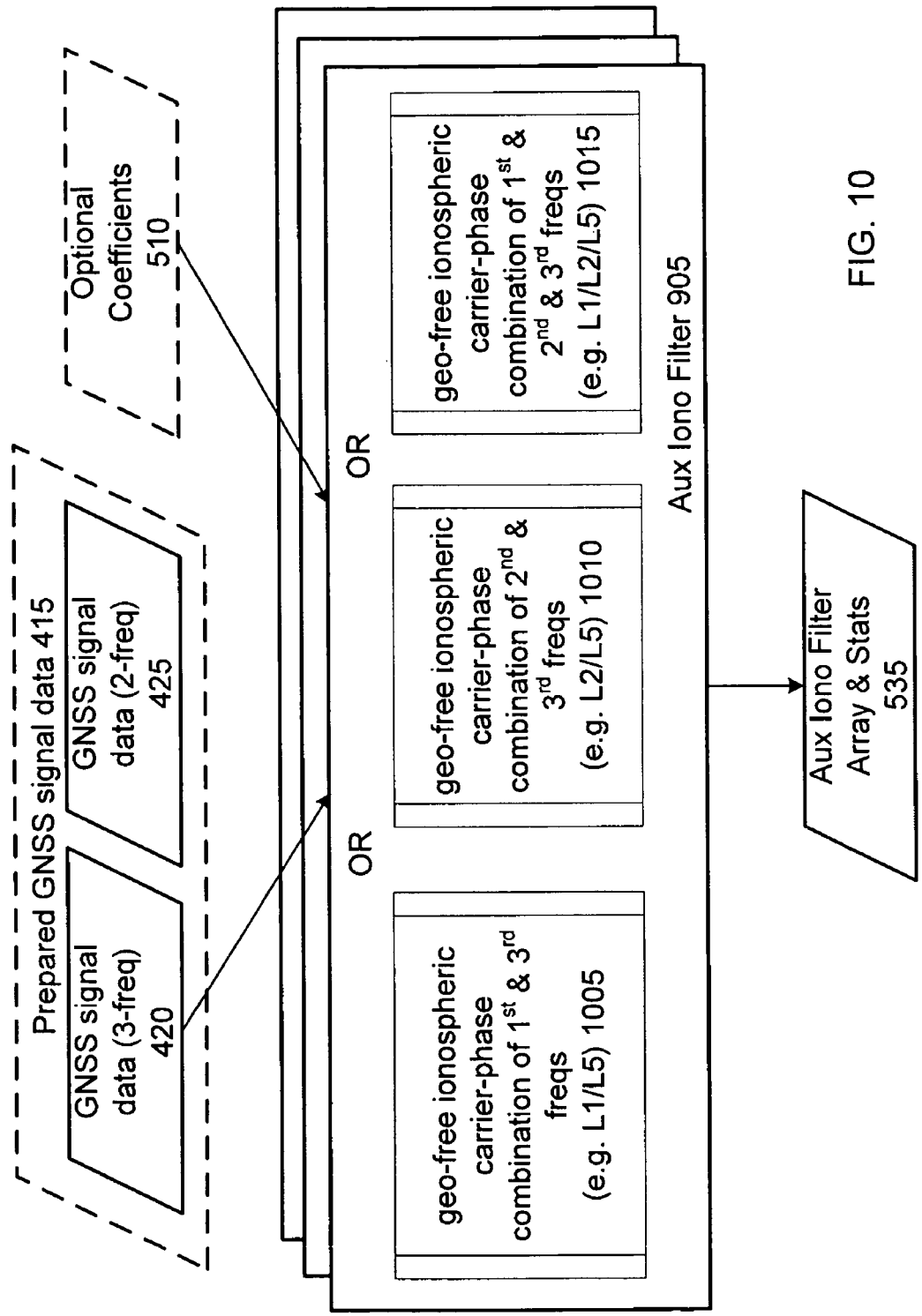
FIG. 10 schematically illustrates optional auxiliary ionosphere filter architectures in accordance with some embodiments of the invention.

FIG. 10 schematically illustrates optional auxiliary ionosphere filter architectures in accordance with some embodiments of the invention. Auxiliary ionosphere filters 905, 910, . . . 915 in accordance with some embodiments use a two-frequency geometry-free ionospheric carrier-phase combination 1005 (e.g., GPS L1/L5) employing different frequencies than the ionosphere filters of iono filter bank 520 (which may use e.g. GPS L1//L2). Auxiliary ionosphere filters 905, 910, . . . 915 in accordance with some embodiments use a two-frequency geometry-free ionospheric carrier-phase combination 1010 (e.g. GPS L2/L5) employing different frequencies than the ionosphere filters of iono filter bank 520. Auxiliary ionosphere filters 905, 910, . . . 915 in accordance with some embodiments use a minimum-error three-or-more-frequency geometry-free ionospheric carrier-phase combination 1015 (e.g., GPS L1/L2/L5).

Figure 11:
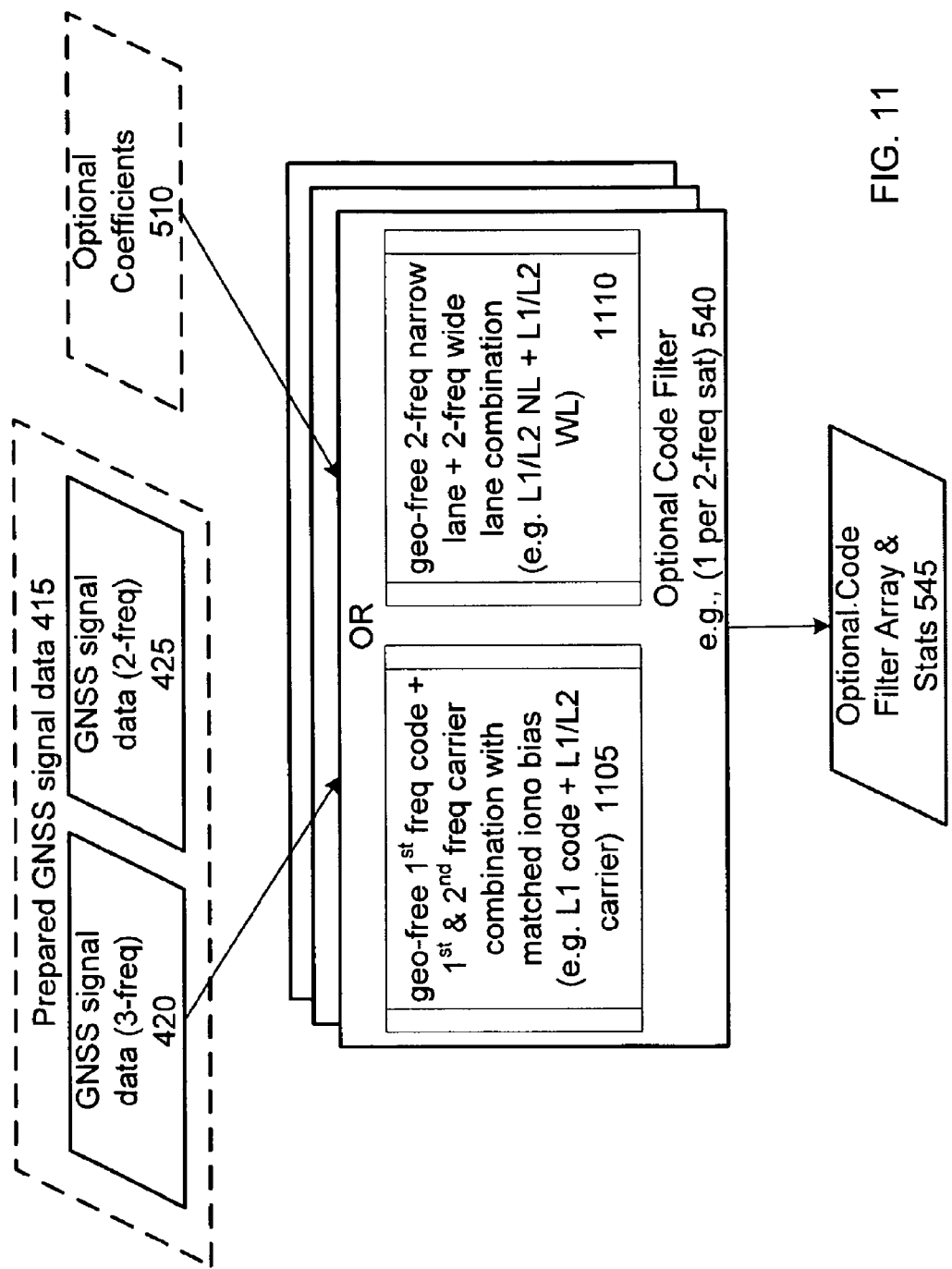
FIG. 11 schematically illustrates optional code filter architectures in accordance with some embodiments of the invention.

FIG. 11 schematically illustrates optional code filter architectures in accordance with some embodiments of the invention. In one embodiment, optional code filter bank 540 produces array 545 by applying to the prepared data 420, 425 of each satellite having two-or-more-frequency observations a respective code (code-carrier) filter 540. Optional code filter/s 540 in accordance with some embodiments use a combination 1105 of geometry-free first-frequency code observations and first-and-second-frequency carrier-phase combination observations having matched ionospheric bias (e.g., GPS L1 code+GPS L1/L2 carrier-phase with matched iono bias). Optional code filter/s 540 in accordance with some embodiments use a combination 1110 of geometry-free dual-frequency narrow-lane combinations with dual-frequency wide-lane combinations (e.g., GPS L1/L2 narrow-lane+GPS L1/L2 wide-lane).

Figure 12:
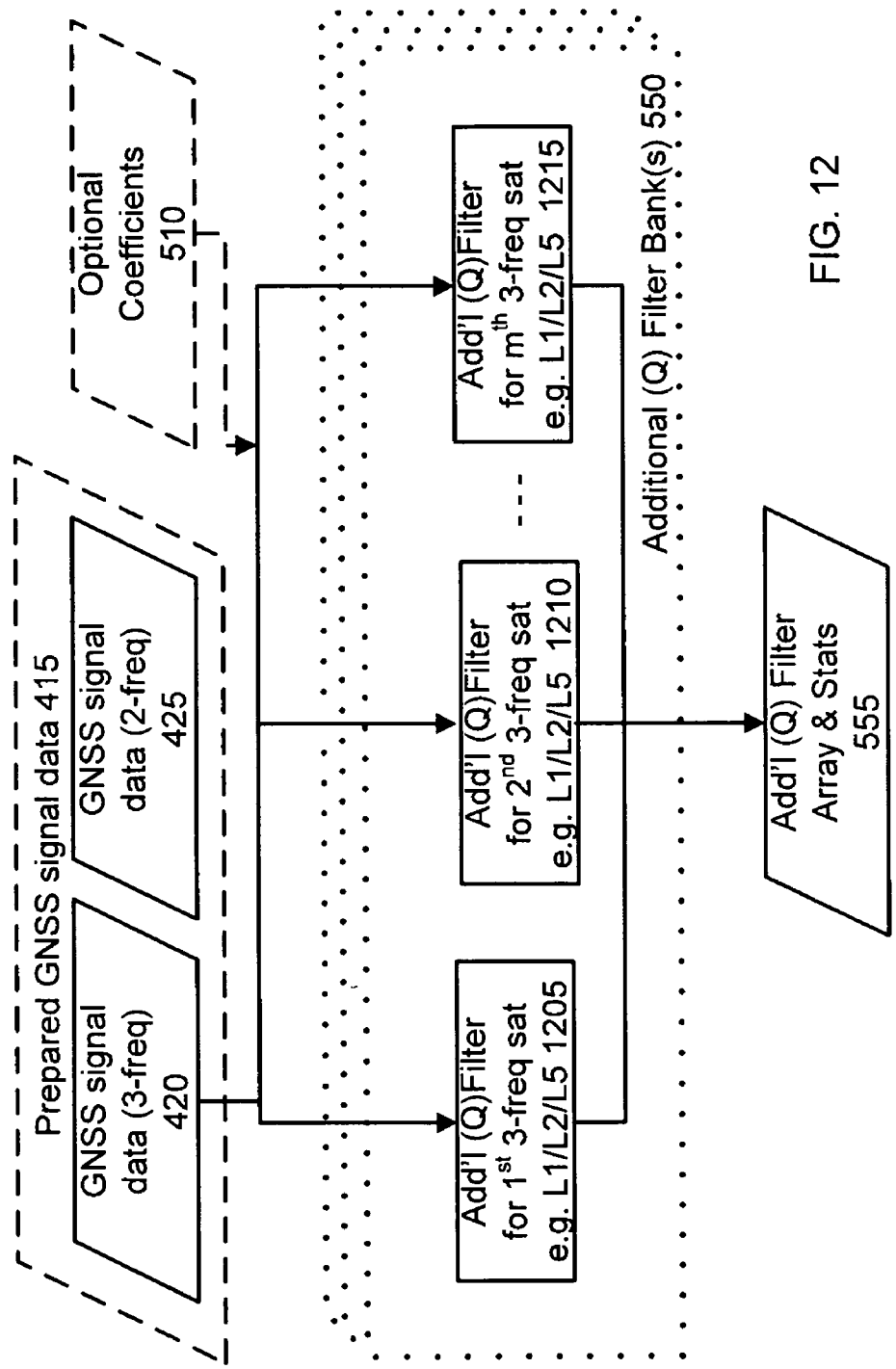
FIG. 12 schematically illustrates three-or-more-frequency additional (Q) filter banks in accordance with some embodiments of the invention.

FIG. 12 schematically illustrates three-or-more-frequency additional (Q) filter banks in accordance with some embodiments of the invention. In one embodiment, additional (Q) filter bank/s 550 produce array 555 by applying to the prepared three-or-more-frequency data 420 for each satellite having three-or-more-frequency observations a respective additional (Q) filter 1205, 1210, . . . 1215. Additional (Q) filters 1205, 1210, . . . 1215 in accordance with some embodiments use a geometry-free, ionosphere-free three-frequency carrier-phase combination (e.g., GPS L1/L2/L5) as in the "Quintessence" filters of U.S. Pat. No. 7,432,853.

Figure 13:
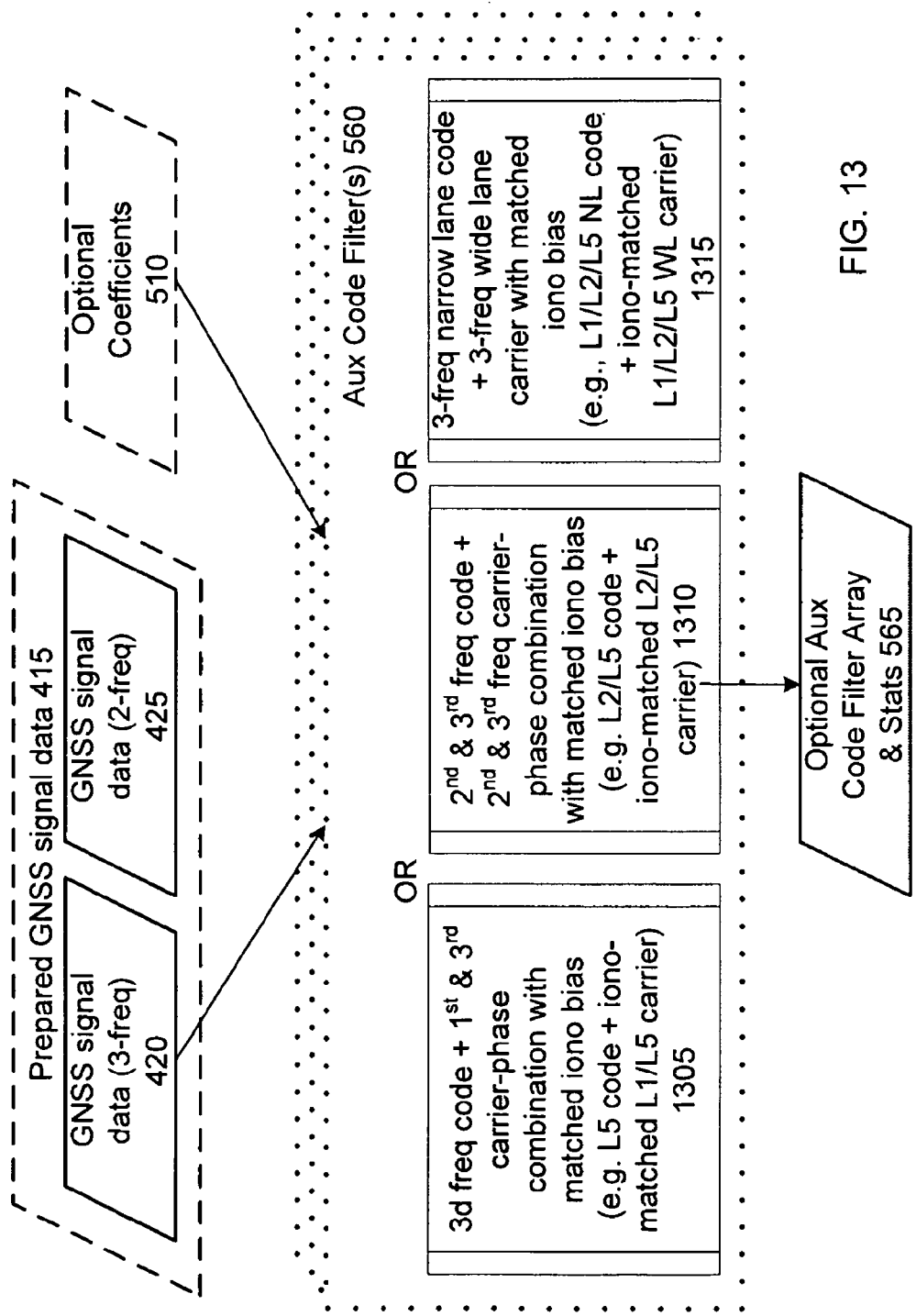
FIG. 13 schematically illustrates optional auxiliary code filter architectures in accordance with some embodiments of the invention.

FIG. 13 schematically illustrates optional auxiliary code filter architectures in accordance with some embodiments of the invention. In one embodiment, auxiliary code filter bank 560 produces array 565 by applying to the prepared data 420 of each satellite having three-or-more-frequency observations a respective auxiliary code filter. Optional auxiliary code filter/s 560 in accordance with some embodiments use a combination 1305 of third-frequency code observations (e.g., GPS L5) with first-frequency and third-frequency (e.g., GPS L1 & L5) carrier-phase combinations having ionospheric bias matched to the third-frequency code observations. Optional auxiliary code filter/s 560 in accordance with some embodiments use a combination 1310 of second-frequency and third-frequency code observations (e.g., GPS L2 & L5) with second-frequency and third-frequency (e.g., GPS L2 & L5) carrier-phase combinations having ionospheric bias matched to the second-frequency and third-frequency code observations. Optional auxiliary code filter/s 560 in accordance with some embodiments use a combination 1315 of three-frequency narrow-lane code observations (e.g., GPS L1/L2/L5 narrow-lane code) with three-frequency wide-lane carrier-phase observations (e.g., GPS L1/L2/L5 wide-lane carrier) carrier-phase combinations having ionospheric bias matched to the three-frequency code observations.

Figure 14:
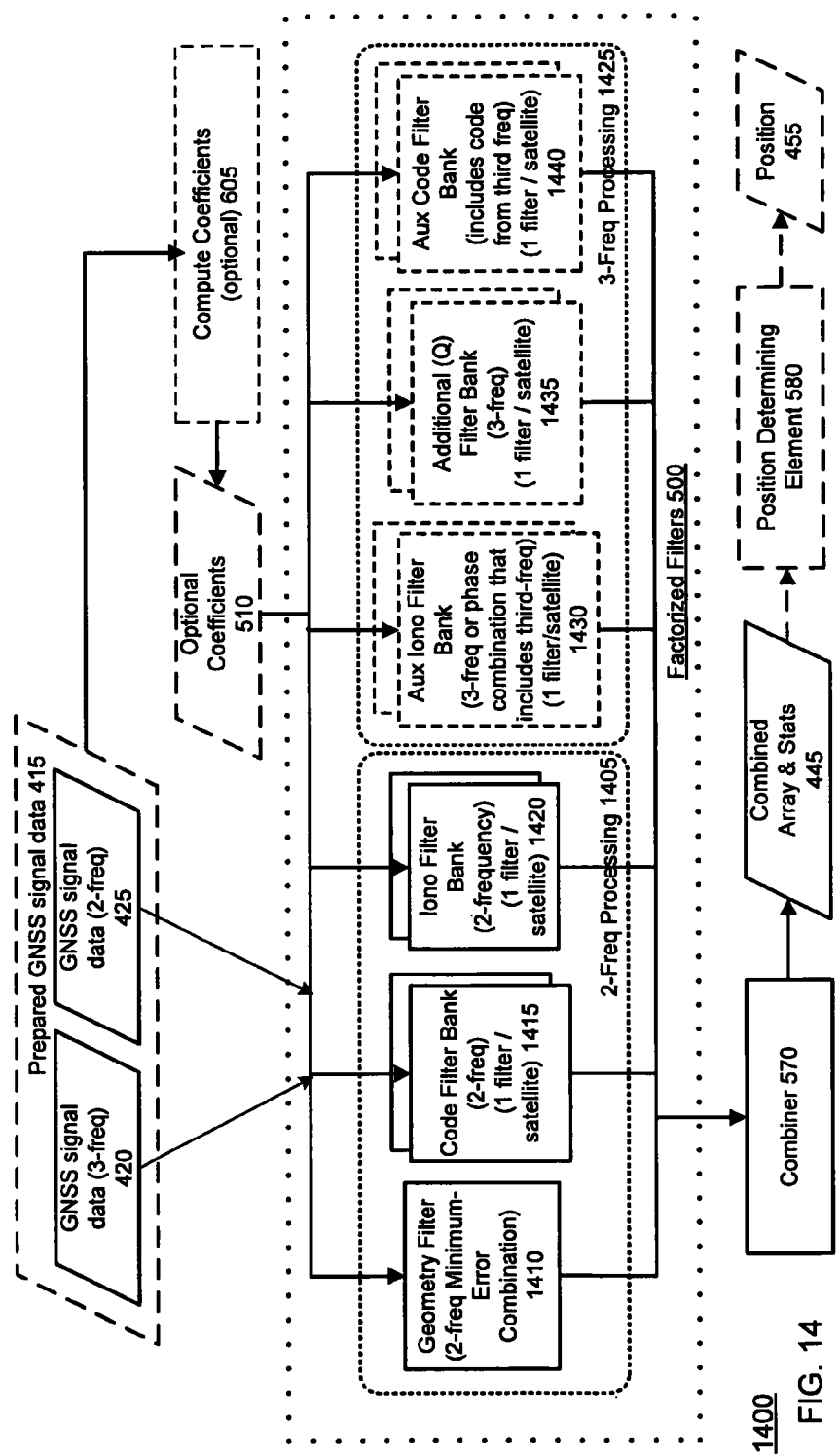
FIG. 14 schematically illustrates a filter architecture for mixed two-frequency and three-or-more-frequency GNSS signal processing in accordance with some embodiments of the invention.

FIG. 14 schematically illustrates a filter architecture 1400 for mixed two-frequency and three-or-more-frequency GNSS signal processing in accordance with some embodiments of the invention. In this embodiment, dual-frequency filters 1405 include a geometry filter 1410, code filter bank/s 1415 and ionosphere filter banks/ 1420, and triple-frequency filters 1425 include auxiliary ionosphere filter bank/s 1430, optional additional (Q) ("Quintessence") filter bank/s 1435 and optional auxiliary code filter bank/s 1440. In this embodiment, geometry filter 1410 uses a minimum-error dual-frequency (e.g., GPS L1/L2) combination, code filter bank/s 1415 have one filter per satellite each using a dual-frequency (e.g., GPS L1/L2) code-carrier combination, and ionosphere filter bank/s 1420 have one filter per satellite each using a dual-frequency (e.g., GPS L1/L2) geometry-free carrier-phase combination, auxiliary ionosphere filter bank/s 1430 have one filter per three-frequency satellite each using a three-frequency (e.g., GPS L1/L2/L5) ionospheric carrier-phase combination or a two-frequency ionospheric phase combination using a third frequency (e.g., GPS L1/L5 or GPS L2/L5), optional additional (Q) ("Quintessence") filter bank/s 1435 have one filter per three-frequency satellite each using a three-frequency (e.g., GPS L1/L2/L5) geometry-free and ionosphere-free carrier-phase combination, and optional auxiliary code filter bank/s 1440 have one filter per three-frequency satellite each using a code-carrier combination which includes the code from the third frequency (e.g., GPS L5 code+GPS L1 /L5 carrier phase).

Figure 15:
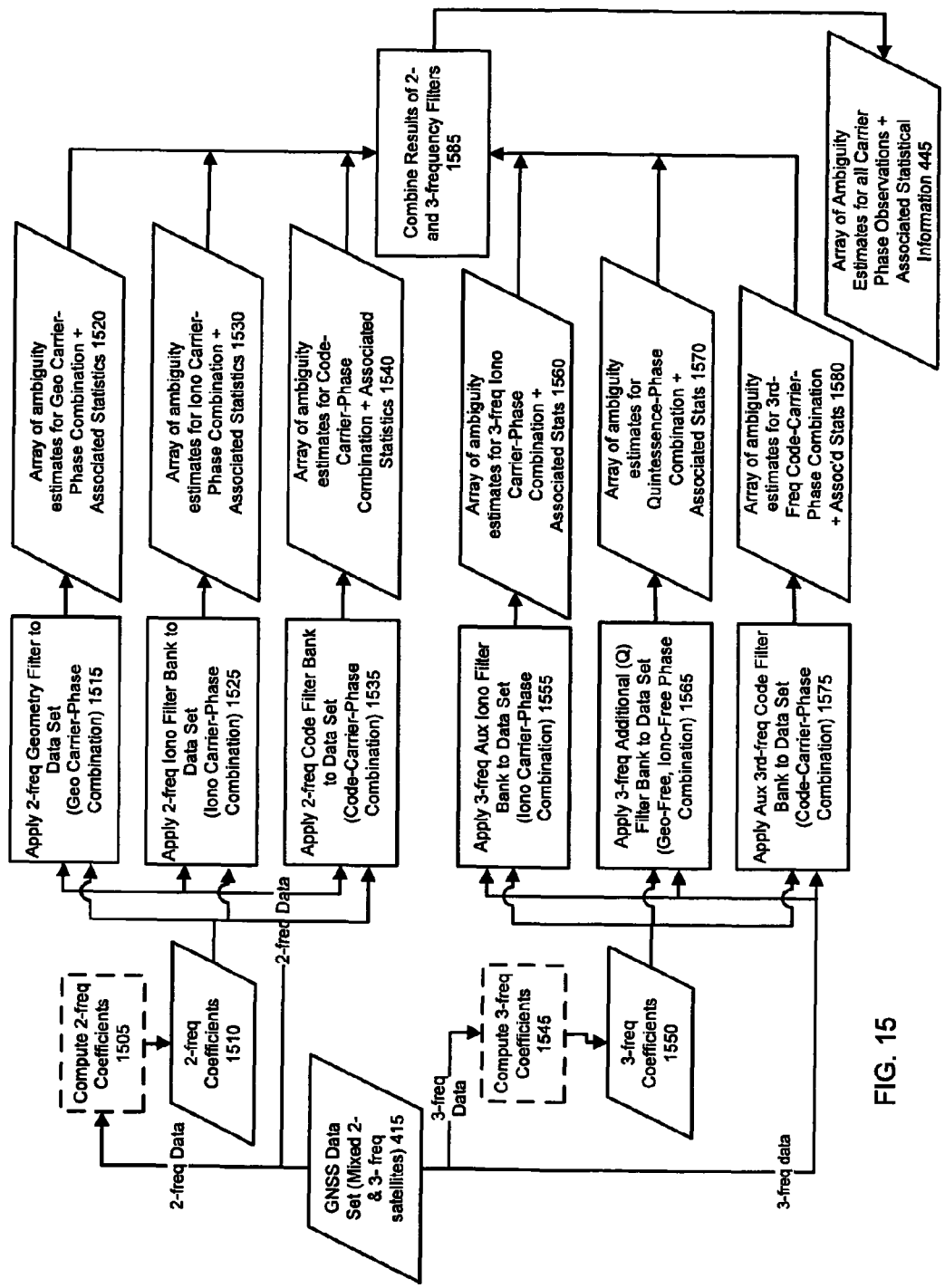
FIG. 15 schematically illustrates a process flow for mixed two-frequency and three-or-more-frequency GNSS signal processing in accordance with some embodiments of the invention.

FIG. 15 schematically illustrates a process flow for mixed two-frequency and three-or-more-frequency GNSS signal processing in accordance with some embodiments of the invention. In this embodiment, at 1505 prepared data set 415 is optionally used to compute two-frequency coefficients 1510. At 1515 the dual-frequency data of prepared data set 415 and optional coefficients 1510 are applied to a two-frequency geometry filter such as filter 1410 to produce an array of ambiguity estimates for the geometry carrier-phase combination and associated statistics 1520; at 1525 the dual-frequency data of prepared data set 415 and optional coefficients 1510 are applied to a two-frequency ionosphere filter bank such as ionosphere-filter bank 1420 to produce an array of ambiguity estimates for the ionospheric carrier-phase combination and associated statistics 1530; and at 1535 the dual-frequency data of prepared data set 415 and optional coefficients 1510 are applied to a two-frequency code filter bank such as code-filter bank 1415 to produce an array of ambiguity estimates for the code+carrier-phase combination and associated statistics 1540.

Also in this embodiment, at 1545 prepared data set 415 is optionally used to compute three-frequency coefficients 1550. At 1555 the three-frequency data of prepared data set 415 and optional coefficients 1550 are applied to a three-frequency auxiliary ionosphere filter bank such as auxiliary ionosphere-filter bank 1430 to produce an array of ambiguity estimates using an ionospheric carrier-phase combination using the third frequency and associated statistics 1560; at 1565 the three-frequency data of prepared data set 415 and optional coefficients 1550 are applied to a three-frequency additional (Q) ("Quintessence") filter bank such as additional (Q) filter bank 1435 to produce an array of ambiguity estimates for the geometry-free and iono-free carrier-phase "Quintessence" combination and associated statistics 1570; and at 1575 the three-frequency data of prepared data set 415 and optional coefficients 1550 are applied to a three-frequency auxiliary code filter bank such as auxiliary-code-filter bank 1440 to produce an array of ambiguity estimates for a code+carrier-phase combination using the third-frequency and associated statistics 1580. At 1585 the results of arrays 1520, 1530, 1540, 1560, 1570 and 1580 are combined to produce the combined array of ambiguity estimates for all carrier-phase observations and associated statistical information 445.

Figure 16:
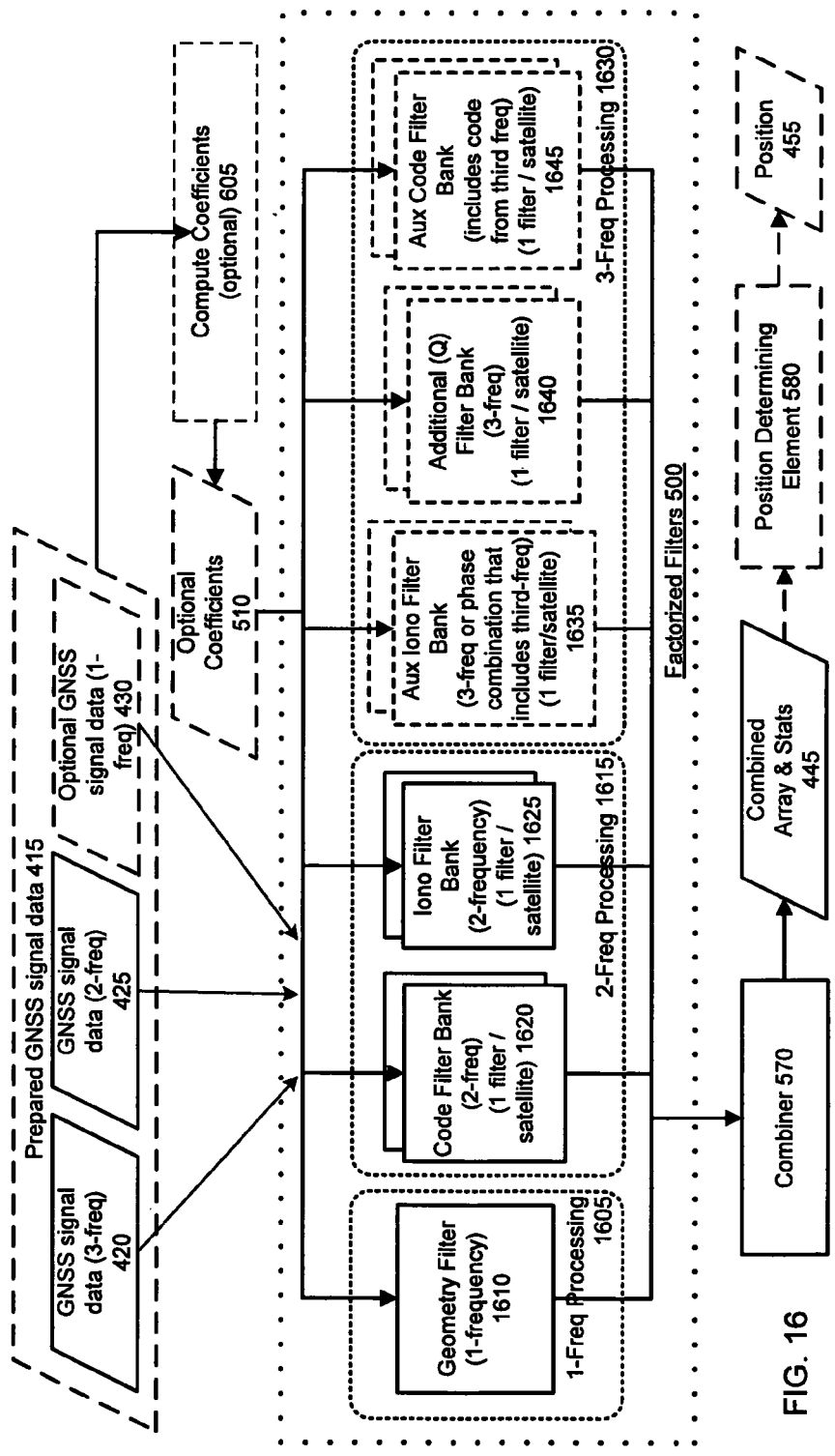
FIG. 16 schematically illustrates a filter architecture for mixed one-frequency, two-frequency and three-or-more-frequency GNSS signal processing in accordance with some embodiments of the invention.

FIG. 16 schematically illustrates a filter architecture for mixed one-frequency, two-frequency and three-or-more-frequency GNSS signal processing in accordance with some embodiments of the invention. In this embodiment, the single-frequency processing 1605 is performed with a single-frequency geometry filter 1610, dual-frequency filters 1615 include code filter bank/s 1620 and ionosphere filter bank/s 1625, and triple-frequency filters 1630 include auxiliary ionosphere filter bank/s 1635, optional additional (Q) ("Quintessence") filter bank/s 1640 and optional auxiliary code filter banks 1645. In this embodiment, geometry filter 1610 uses a single-frequency combination (e.g., GPS L1-only carrier-phase or GPS L1 carrier-phase & L1 code or GPS L1-GRAPHIC combination), code filter bank/s 1620 have one filter per satellite each using a dual-frequency (e.g., GPS L1/L2) code-carrier combination, and ionosphere filter bank/s 1625 have one filter per satellite each using a dual-frequency (e.g., GPS L1/L2) geometry-free carrier-phase combination, auxiliary ionosphere filter bank/s 1635 have one filter per three-frequency satellite each using a three-frequency (e.g., GPS L1/L2/L5) ionospheric carrier-phase combination or a two-frequency ionospheric phase combination using a third frequency (e.g., GPS L1/L5 or GPS L2/L5), optional additional (Q) ("Quintessence") filter banks 1640 have one filter per three-frequency satellite each using a three-frequency (e.g., GPS L1/L2/L5) geometry-free and ionosphere-free carrier-phase combination, and optional auxiliary code filter bank/s 1645 have one filter per three-frequency satellite each using a code-carrier combination which includes the code from the third frequency (e.g., GPS L5 code+GPS L1/L5 carrier phase).

Figure 17:
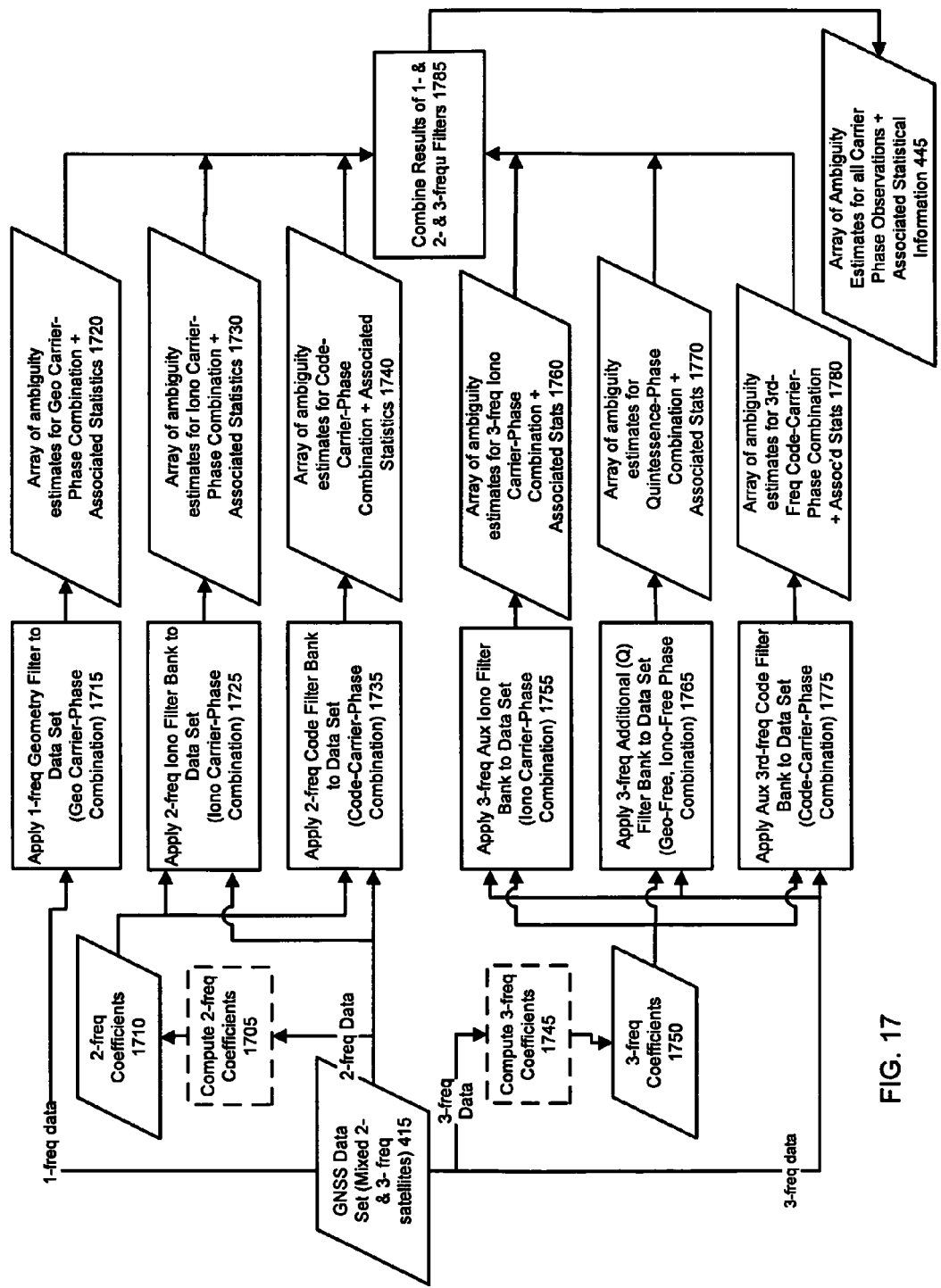
FIG. 17 schematically illustrates a process flow for mixed one-frequency, two-frequency and three-or-more-frequency GNSS signal processing in accordance with some embodiments of the invention.

FIG. 17 schematically illustrates a process flow for mixed one-frequency, two-frequency and three-or-more-frequency GNSS signal processing in accordance with some embodiments of the invention. In this embodiment, at 1705 prepared data set 415 is optionally used to compute two-frequency coefficients 1710. At 1715 the single-frequency data of prepared data set 415 are applied to a single-frequency geometry filter such as filter 1610 to produce an array of ambiguity estimates for the geometry carrier-phase combination and associated statistics 1720; at 1725 the dual-frequency data of prepared data set 415 and optional coefficients 1710 are applied to a two-frequency ionosphere filter bank such as ionosphere-filter bank 1625 to produce an array of ambiguity estimates for the ionospheric carrier-phase combination and associated statistics 1730; and at 1735 the dual-frequency data of prepared data set 415 and optional coefficients 1710 are applied to a two-frequency code filter bank such as code-filter bank 1620 to produce an array of ambiguity estimates for the code+carrier-phase combination and associated statistics 1740.

Also in this embodiment, at 1745 prepared data set 415 is optionally used to compute three-frequency coefficients 1750. At 1755 the three-frequency data of prepared data set 415 and optional coefficients 1750 are applied to a three-frequency auxiliary ionosphere filter bank such as auxiliary ionosphere-filter bank 1635 to produce an array of ambiguity estimates using an ionospheric carrier-phase combination using the third frequency and associated statistics 1760; at 1765 the three-frequency data of prepared data set 415 and optional coefficients 1750 are applied to a three-frequency additional (Q) ("Quintessence") filter bank such as additional (Q) filter bank 1640 to produce an array of ambiguity estimates for the geometry-free and iono-free carrier-phase "Quintessence" combination and associated statistics 1770; and at 1775 the three-frequency data of prepared data set 415 and optional coefficients 1750 are applied to a three-frequency auxiliary code filter bank such as auxiliary-code-filter bank 1645 to produce an array of ambiguity estimates for a code+carrier-phase combination using the third-frequency and associated statistics 1780. At 1785 the results of arrays 1720, 1730, 1740, 1760, 1770 and 1780 are combined to produce the combined array of ambiguity estimates for all carrier-phase observations and associated statistical information 445.

The Kalman filter processing power requirement increases quadratically with number of states, linearly with number of observations.

Some embodiments in accordance with the invention use iono filters as described in International Patent Publication WO 2007/032947.

Following are Kalman filter state descriptions in accordance with some embodiments:

Geometry Filter (L1 carrier-phase/L1 GRAPHIC combination) $[x, y, z, t, n_{L1}^1, n_{L1}^2, \ldots n_{L1}^s]^T$ Geometry Filter (mixed L1/L2 operation) $[x, y, z, t, n_{L1}^1 n_{L2}^1, n_{L1}^2 n_{L2}^2, \ldots n_{L1}^s n_{L2}^s]^T$ Geometry Filter (minimum-error L1/L2) $[x, y, z, t, n_{ME}^1, n_{ME}^2, \ldots n_{ME}^s]^T$ The iono filter carrier-phase combination is given by:
$\phi_I = \lambda_{L1}\phi_{L1} - \lambda_{L2}\phi_{L2} - n_1$ Iono ambiguity $n_1$ and multipath $mp_1$ are estimated in the into filter Iono Filters (simple) $[n_1, mp_1]^T$ Code filters ambiguity term $n_{phase}$ corresponds to the carrier used in the code filter.

On short baselines, tightly constrain iono filters, e.g., with receivers are near each other the $\Delta$ iono is zero.

Some embodiments in accordance with the invention use an L1/L2 geometry filter and, upon dropout of the L2 signal from one or more satellites, switches to an L1-only geometry filter.

Code (code-carrier) Filters $[n_{phase}, mp_{code}]^T$

Q Filters $[n_{phase}, mp_{phase}]^T$

Any plurality of the above described aspects of the invention may be combined to form further aspects and embodiments, with the aim of providing additional benefits notably in terms of convergence speed, recovery from jumps and/or system usability.

Any of the above-described apparatuses and their embodiments may be integrated into a rover, a reference receiver or a network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a reference receiver or a network station including any one of the above apparatuses.

In one embodiment, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of processing a set of GNSS signal data derived from signals of a first set of satellites having at least three carriers and signals of a second set of satellites having two carriers, comprising:
   a. applying to the set of GNSS signal data a geometry filter using a geometry filter combination to obtain an array of geometry-filter ambiguity estimates for the geometry filter combination and associated statistical information,
   b. applying to the set of GNSS signal data a bank of ionosphere filters each using a two-frequency ionospheric combination to obtain an array of ionosphere-filter ambiguity estimates for the two frequency ionospheric combinations and associated statistical information, wherein each said two frequency ionospheric combination comprises a geometry-free two-frequency ionospheric residual carrier-phase combination of observations of a first frequency and observations of a second frequency;
   c. applying to the set of GNSS signal data a bank of auxiliary ionosphere filters each using an auxiliary ionospheric combination to obtain an array of auxiliary-ionosphere-filter ambiguity estimates for the auxiliary ionospheric combinations and associated statistical information, wherein each said auxiliary ionospheric combination uses carrier-phase observations of a third frequency and carrier-phase observations of at least one of the first frequency and the second frequency, and
   d. preparing a combined array of ambiguity estimates for all carrier phase observations and associated statistical information by combining the arrays of the geometry filter and the ionosphere filters and the auxiliary ionosphere filters.

2. The method of claim 1, wherein the geometry filter combination comprises one of: (1) a two-frequency geometry carrier-phase combination, (2) a single-frequency carrier-phase and code combination, and (3) a single-frequency carrier-phase and GRAPHIC combination.

3. The method of claim 2, wherein the two-frequency geometry carrier-phase combination is a minimum-error combination.

4. The method of claim 2, wherein the two-frequency geometry carrier--phase combination is a combination of the GPS L1 carrier frequency and the GPS L2 carrier frequency.

5. The method of claim 2, wherein the single-frequency carrier-phase and code combination is a combination of GPS L1 carrier-phase and GPS L1 code.

6. The method of claim 2, wherein the single-frequency of the single-frequency carrier-phase and GRAPHIC combination is the GPS L1 carrier frequency.

7. The method of claim 1, wherein the bank of ionosphere filters comprises one said ionosphere filter per satellite of the second set of satellites.

8. The method of claim 1, wherein the auxiliary ionospheric combination comprises one of: (1) a two frequency geometry free ionospheric carrier-phase combination of the first frequency and the third frequency, and (2) a three frequency geometry-free ionospheric carrier-phase combination of the first frequency, the second frequency and the third frequency.

9. The method of claim 1, wherein the auxiliary ionospheric combination is a minimum-error combination.

10. The method of claim 1, wherein the bank of auxiliary ionosphere filters comprises one said auxiliary ionosphere filter per satellite of the first set of satellites.

11. The method of claim 1, further comprising applying to the set of GNSS signal data at least one code filter using a respective geometry-free code-carrier combination to obtain an array of ambiguity estimates for the code-carrier combinations and associated statistical information.

12. The method of claim 11, wherein preparing a combined array corn rises combining said arrays of said at least one code filter with the arrays of the geometry filter and the ionosphere filters and the auxiliary ionosphere filters to obtain said combined array of ambiguity estimates for all carrier phase observations and associated statistical information.

13. The method of claim 11, wherein each geometry-free code-carrier combination comprises one of: (1) a combination of a first-frequency code observation with a first and second-frequency carrier phase combination in which ionospheric bias of the first- and second-frequency carrier phase combination is matched to ionospheric bias of the first-frequency code observation; and (2) a two-frequency narrow-lane code combination with a two-frequency wide-lane carrier-phase combination.

14. The method of claim 11, wherein said at least one code filter comprises one said code filter per satellite of the second set of satellites.

15. The method of claim 11, further comprising applying to the set of GNSS signal data derived from the first set of satellites at least one bank of additional filters, wherein each additional filter uses a geometry free and ionosphere-free carrier-phase combination of at least three frequencies to obtain an array of ambiguity estimates for the geometry free and ionosphere-free carrier-phase combination and associated statistical information, and wherein preparing a combined array comprises one of: (1) combining said arrays of said additional filters with the arrays of the geometry filter and the ionosphere filters and the auxiliary ionosphere filters to obtain said combined array of ambiguity estimates for all carrier phase observations and associated statistical information; and (2) combining said arrays of said additional filters with the arrays of said at least one code filter and the geometry filter and the ionosphere filters and the auxiliary ionosphere filters to obtain said combined array of ambiguity estimates for all carrier phase observations and associated statistical information.

16. The method of claim 15, wherein said at least one bank of additional filters comprises at least one said additional filter per satellite of the first set of satellites.

17. The method of claim 15 further comprising applying to the set of GNSS signal data at least one auxiliary code filter using a respective geometry-free auxiliary code-carrier combination to obtain an array of ambiguity estimates for the auxiliary code-carrier combination and associated statistical information, and wherein preparing a combined array comprises one of: (1) combining said arrays of said additional filters with the arrays of the geometry filter and the ionosphere filters and the auxiliary ionosphere filters to obtain said combined array of ambiguity estimates for all carrier phase observations and associated statistical information, (2) combining the arrays of said at least one auxiliary code filter with the arrays of the geometry filter and the ionosphere filters and the auxiliary ionosphere filters and the at least one code filter to obtain said combined array of ambiguity estimates for all carrier phase observations and associated statistical information, and (3) combining the arrays of said at least one auxiliary code filter with the arrays of the geometry filter and the ionosphere filters and the auxiliary ionosphere filters and the at least one code filter and the additional filters to obtain said combined array of ambiguity estimates for all carrier phase observations and associated statistical information.

18. The method of claim 17, wherein each auxiliary code-carrier combination comprises one of: (1) a combination of a third-frequency code observation with a first-and third-frequency carrier phase combination in which ionospheric bias of the first-and third-frequency carrier phase combination is matched to ionospheric bias of the third-frequency code observation, (2) a combination of a second- and third-frequency code combination with a second- and third-frequency carrier phase combination in which ionospheric bias of the second- and third-frequency carrier phase combination is matched to ionospheric bias of the second- and third-frequency code combination, and (3) a combination of a three-frequency narrow-lane code combination with a three-frequency wide-lane carrier phase combination in which ionospheric bias of the three-frequency wide-lane carrier-phase combination is matched to ionospheric bias of the three-frequency code combination.

19. The method of claim 17, wherein said at least one auxiliary code filter comprises one said auxiliary code filter per satellite of the first set of satellites.

20. The method of claim 1, wherein the satellites are satellites of the Global Positioning System (GPS), wherein the first set of satellites have GPS carriers L1, L2 and L5 and wherein the second set of satellites have GPS carriers L1 and L2.

21. Apparatus for processing a set of GNSS signal data derived from signals of a first set of satellites having at least three carriers and signals of a second set of satellites having two carriers, comprising at least one processor with associated memory and a plurality of filters comprising:
  a. a geometry filter using a geometry filter combination to Produce from the set of GNSS signal data an array of geometry-filter ambiguity estimates for the geometry filter combination and associated statistical information,
  b. a bank of ionosphere filters each using a two-frequency ionospheric combination to obtain from the set of GNSS signal data an array of ionosphere-filter ambiguity estimates for the two frequency ionospheric combinations and associated statistical information, wherein each said two-frequency ionospheric combination comprises a geometry-free two-frequency ionospheric residual carrier-phase combination of observations of a first frequency and observations of a second frequency;
  c. a bank of auxiliary ionosphere filters each using an auxiliary ionospheric combination to obtain from the set of GNSS signal data an array of auxiliary-ionosphere-filter ambiguity estimates for the auxiliary ionospheric combinations and associated statistical information, wherein each said auxiliary ionospheric combination uses carrier phase observations of a third frequency and carrier-phase observations of at least one of the first frequency and the second frequency, and
  d. a combiner to prepare a combined array of ambiguity estimates for all carrier phase observations and associated statistical information by combining the arrays of the geometry filter and the ionosphere filters and the auxiliary ionosphere filters.

22. The apparatus of claim 21, wherein the geometry filter combination comprises one of: (1) a two-frequency geometry carrier-phase combination, (2) a single-frequency carrier-phase and code combination, and (3) a single-frequency carrier-phase and GRAPHIC combination.

23. The apparatus of claim 22, wherein the two-frequency geometry carrier-phase combination is a minimum-error combination.

24. The apparatus of claim 22, wherein the two-frequency geometry carrier-phase combination is a combination of the GPS L1 carrier frequency and the GPS L2 carrier frequency.

25. The apparatus of claim 22, wherein the single-frequency carrier-phase and code combination is a combination of GPS L1 carrier-phase and GPS L1 code.

26. The apparatus of claim 22, wherein the single-frequency of the single-frequency carrier-phase and GRAPHIC combination is the GPS L1 carrier frequency.

27. The apparatus of claim 21, wherein the bank of ionosphere filters comprises one said ionosphere filter per satellite of the second set of satellites.

28. The apparatus of claim 21, wherein the auxiliary ionospheric combination comprises one of: (1) a two-frequency geometry-free ionospheric carrier-phase combination of the first frequency and the third frequency, and (2) a three-frequency geometry-free ionospheric carrier-phase combination of the first frequency, the second frequency and the third frequency.

29. The apparatus of claim 21, wherein the auxiliary ionospheric combination is a minimum-error combination.

30. The apparatus of claim 21, wherein the bank of auxiliary ionosphere filters comprises one said auxiliary ionosphere filter per satellite of the first set of satellites.

31. The apparatus of claim 21, further comprising means for applying to the set of GNSS signal data at least one code filter using a respective geometry-free code-carrier combination to obtain an array of ambiguity estimates for the code-carrier combinations and associated statistical information.

32. The apparatus of claim 31, wherein the combiner comprises means for combining said arrays of said at least one code filter with the arrays of the geometry filter and the ionosphere filters and the auxiliary ionosphere filters to obtain said combined array of ambiguity estimates for all carrier phase observations and associated statistical information.

33. The apparatus of claim 31, wherein each geometry-free code-carrier combination comprises one of: (1) a combination of a first-frequency code observation with a first- and second-frequency carrier phase combination in which ionospheric bias of the first- and second-frequency carrier phase combination is matched to ionospheric bias of the first-frequency code observation; and (2) a two-frequency narrow-lane code combination with a two-frequency wide-lane carrier-phase combination.

34. The apparatus of claim 21, wherein said at least one code filter comprises one said code filter per satellite of the second set of satellites.

35. The apparatus of claim 31, further comprising means for applying to the set of GNSS signal data derived from the first set of satellites at least one bank of additional filters, wherein each additional filter uses a geometry-free and ionosphere-free carrier-phase combination of at least three frequencies to obtain an array of ambiguity estimates for the geometry-free and ionosphere-free carrier-phase combination and associated statistical information, and wherein the means for preparing a combined array comprises one of: (1) means for combining said arrays of said additional filters with the arrays of the geometry filter and the ionosphere filters and the auxiliary ionosphere filters to obtain said combined array of ambiguity estimates for all carrier phase observations and associated statistical information; and means for combining said arrays of said additional filters with the arrays of said at least one code filter and the geometry filter and the ionosphere filters and the auxiliary ionosphere filters to obtain said combined array of ambiguity estimates for all carrier phase observations and associated statistical information.

36. The apparatus of claim 35, wherein said at least one bank of additional filters comprises at least one said additional filter per satellite of the first set of satellites.

37. The apparatus of claim 35, further comprising means for applying to the set of GNSS signal data at least one auxiliary code filter using a respective geometry-free auxiliary code-carrier combination to obtain an array of ambiguity estimates for the auxiliary code-carrier combination and associated statistical information, and wherein the means for preparing a combined array comprises one of: (1) means for combining said arrays of said additional filters with the arrays of the geometry filter and the ionosphere filters and the auxiliary ionosphere filters to obtain said combined array of ambiguity estimates for all carrier phase observations and associated statistical information, (2) means for combining the arrays of said at least one auxiliary code filter with the arrays of the geometry filter and the ionosphere filters and the auxiliary ionosphere filters and the at least one code filter to obtain said combined array of ambiguity estimates for all carrier phase observations and associated statistical information, and (3) means for combining the arrays of said at least one auxiliary code filter with the arrays of the geometry filter and the ionosphere filters and the auxiliary ionosphere filters and the at least one code filter and the additional filters to obtain said combined array of ambiguity estimates for all carrier phase observations and associated statistical information.

38. The apparatus of claim 37, wherein each auxiliary code-carrier combination comprises one of: (1) a combination of a third-frequency code observation with a first-and third-frequency carrier phase combination in which ionospheric bias of the first-and third-frequency carrier phase combination is matched to ionospheric bias of the third-frequency code observation, (2) a combination of a second- and third-frequency code combination with a second- and third-frequency carrier phase combination in which ionospheric bias of the second- and third-frequency carrier phase combination is matched to ionospheric bias of the second- and third-frequency code combination, and (3) a combination of a three-frequency narrow-lane code combination with a three-frequency wide-lace carrier phase combination in which ionospheric bias of the three-frequency wide-lane carrier-phase combination is matched to ionospheric bias of the three-frequency code combination.

39. The apparatus of claim 37, wherein said at least one auxiliary code filter comprises one said auxiliary code filter per satellite of the first set of satellites.

40. The apparatus of claim 21, wherein the satellites are satellites of the Global Positioning System (GPS), wherein the first set of satellites have GPS carriers L1, L2 and L5 and wherein the second set of satellites have GPS carriers L1 and L2.

41. A non-transitory computer-usable medium having a computer readable program code embodied therein, said computer readable program code adapted to be executed to implement the method according to claim 1.

* * * * *